(12) United States Patent
Kimura et al.

(10) Patent No.: US 12,184,909 B2
(45) Date of Patent: Dec. 31, 2024

(54) SIGNAL PROCESSING APPARATUS AND SIGNAL PROCESSING METHOD

(71) Applicant: SONY GROUP CORPORATION, Tokyo (JP)

(72) Inventors: Keiichi Kimura, Kanagawa (JP); Koji Kamiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 30 days.

(21) Appl. No.: 17/908,438

(22) PCT Filed: Mar. 18, 2021

(86) PCT No.: PCT/JP2021/011004
§ 371 (c)(1),
(2) Date: Aug. 31, 2022

(87) PCT Pub. No.: WO2021/200198
PCT Pub. Date: Oct. 7, 2021

(65) Prior Publication Data
US 2024/0048784 A1 Feb. 8, 2024

(30) Foreign Application Priority Data
Mar. 30, 2020 (JP) ................................ 2020-060015

(51) Int. Cl.
*H04N 21/235* (2011.01)
*H04N 21/236* (2011.01)
(52) U.S. Cl.
CPC ... *H04N 21/2353* (2013.01); *H04N 21/23602* (2013.01)
(58) Field of Classification Search
CPC ......... H04N 21/2353; H04N 21/23602; H04N 21/235; H04N 21/4353; H04N 21/84; H04N 23/661
(Continued)

(56) References Cited

U.S. PATENT DOCUMENTS 7,668,189 B1    2/2010  Grimes et al.
8,879,895 B1   11/2014  Bussières
(Continued)

FOREIGN PATENT DOCUMENTS

CN    1280444 A    1/2001
EP    1089522 A2   4/2001
(Continued)

OTHER PUBLICATIONS

Ancillary Data Packet and Space Formatting of Bit-Serial Digital Interface for 1125/60 HDTV Systems, Apr. 1995.*
(Continued)

*Primary Examiner* — Frantz B Jean
(74) *Attorney, Agent, or Firm* — Paratus Law Group, PLLC

(57) ABSTRACT

There is provided a signal input unit to prevent or reduce an increase in memory hardware on a transmitter or a receiver of a serial digital signal, and to decrease the load on a CPU. The signal input unit receives as an input a video signal and a digital signal for transmission, the digital signal for transmission including a data packet with metadata associated with the video signal. The data writing unit extracts predetermined metadata from the digital signal for transmission on the basis of metadata-specifying information and writes the extracted metadata in an accumulating register. For example, the metadata-specifying information includes header information of the data packet with the predetermined metadata. For example, the header information includes classification information indicating a classification for the predetermined metadata and auxiliary information of the predetermined meta-information.

15 Claims, 15 Drawing Sheets

(58) Field of Classification Search
USPC .......................................................... 348/43
See application file for complete search history.

(56) References Cited

U.S. PATENT DOCUMENTS

| | | |
|---|---|---|
| 2005/0002648 A1 | 1/2005 | Hoshino |
| 2007/0041407 A1 | 2/2007 | Suzuki |
| 2012/0321273 A1 | 12/2012 | Messmer |
| 2022/0321854 A1 | 10/2022 | Kamiya |

FOREIGN PATENT DOCUMENTS

| | | | | | |
|---|---|---|---|---|---|
| JP | 2000115249 A | * | 4/2000 | ............. | H04L 12/40 |
| JP | 2001053825 A | * | 2/2001 | ............. | H04L 29/06 |
| JP | 2001218175 A | * | 8/2001 | ............ | H04N 21/235 |
| JP | 2011-155701 A | | 8/2011 | | |
| KR | 2001-0049698 A | | 6/2001 | | |
| WO | WO-2021029165 A1 | | 2/2021 | | |

OTHER PUBLICATIONS

Ancillary Data Packet and Space Formatting of Bit-serial Digital Interface for 1125/60 HDTV Systems, Standards (Telecommunications, Broadcasting) and Technical Reports (Telecommunications, Broadcasting, General), Dec. 18, 2012, pp. 1-6 and 26, BTA S-005 C 1.1, Association of Radio Industries and Businesses.

* cited by examiner

FIG. 2

(a) HD-SDI / 3G-SDI Level-B

| Line | |
|---|---|
| 1 | VBLANK |
| 8 | Lens Metadata |
| 9 | |
| 10 | |
| 11 | MATERIAL TRANSMISSION AUXILIARY DATA (ARIB TR-B22) |
| 12 | |
| 13 | Camera Trace Metadata, Camera Paint Metadata |
| 14 | HDR SDR Relation Metadata, Down Conv Setting Metadata |
| 15 | ID Group Metadata |
| 16 | |
| 17 | |
| 18 | DIGITAL CLOSED CAPTION DATA (ARIB STD-B37) |
| 19 | INTER-BROADCASTING STATION CONTROL SIGNAL (ARIB STD-B39) |
| 20 | DATA BROADCASTING TRIGGER SIGNAL (ARIB STD-B35) |
| 21 | VIDEO DATA |
| 560 | |
| 561 | VBLANK |
| 570 | Lens Metadata |
| 571 | |
| 572 | Lens Metadata |
| 573 | |
| 574 | MATERIAL TRANSMISSION AUXILIARY DATA (ARIB TR-B22) |
| 575 | |
| 576 | Camera Trace Metadata, Camera Paint Metadata |
| 577 | HDR SDR Relation Metadata, Down Conv Setting Metadata |
| 578 | ID Group Metadata |
| 579 | |
| 580 | |
| 581 | DIGITAL CLOSED CAPTION DATA (ARIB STD-B37) |
| 582 | INTER-BROADCASTING STATION CONTROL SIGNAL (ARIB STD-B39) |
| 583 | DATA BROADCASTING TRIGGER SIGNAL (ARIB STD-B35) |
| 584 | VIDEO DATA |
| 1123 | |
| 1124 | VBLANK |
| 1125 | |

(b) 3G-SDI Level-A / 12G-SDI

| Line | |
|---|---|
| 1 | VBLANK |
| 8 | Lens Metadata |
| 9 | |
| 10 | |
| 11 | MATERIAL TRANSMISSION AUXILIARY DATA (ARIB TR-B22) |
| 12 | |
| 13 | |
| 14 | Camera Trace Metadata, Camera Paint Metadata |
| 15 | HDR SDR Relation Metadata, Down Conv Setting Metadata |
| 16 | ID Group Metadata |
| 17 | |
| 18 | |
| 19 | DIGITAL CLOSED CAPTION DATA (ARIB STD-B37) |
| 20 | INTER-BROADCASTING STATION CONTROL SIGNAL (ARIB STD-B39) |
| 21 | DATA BROADCASTING TRIGGER SIGNAL (ARIB STD-B35) |
| 22 | |
| 23 | |
| 24 | |
| 25 | |
| 26 | |
| 27 | |
| 28 | |
| 29 | |
| 30 | |
| 31 | |
| 32 | MATERIAL TRANSMISSION AUXILIARY DATA |
| 33 | |
| 34 | |
| 35 | |
| 36 | |
| 37 | |
| 38 | |
| 39 | |
| 40 | DIGITAL CLOSED CAPTION DATA |
| 41 | INTER-BROADCASTING STATION CONTROL SIGNAL |
| 42 | DATA BROADCASTING TRIGGER SIGNAL |
| | VIDEO DATA |
| 1121 | |
| 1122 | VBLANK |
| 1125 | |

FIG. 5

EXAMPLE OF CONTENTS OF LPM Flag

```
bit 7 : History flag    [ no(L) / yes(H) ]
bit 6 : Instancy flag   [ no(L) / yes(H) ]
bit 5 : Single flag     [ no(L) / yes(H) ]
bit 4 : (N/M) (L)
bit 3 : (N/M) (L)
bit 2 : (N/M) (L)
bit 1, 0 : Table Data size  [ Large (LL) / Middle (LH) / Small (HL) ]
```

FIG. 8
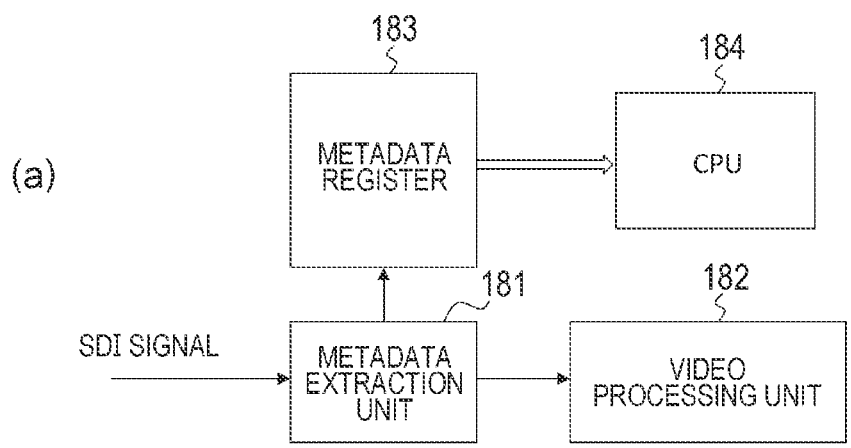
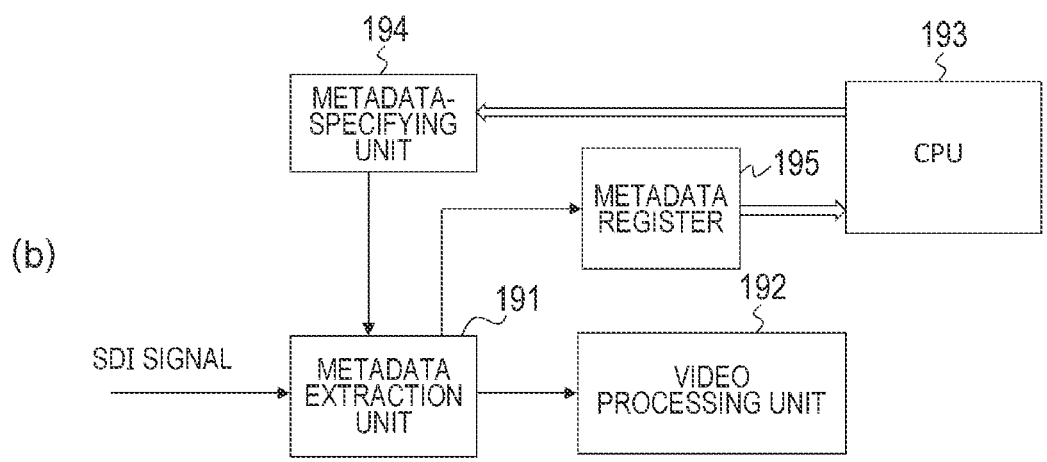

FIG. 11
(a) 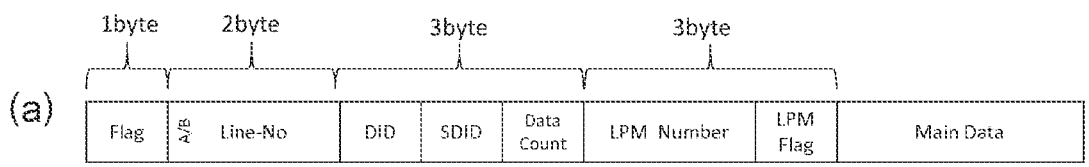
(b) 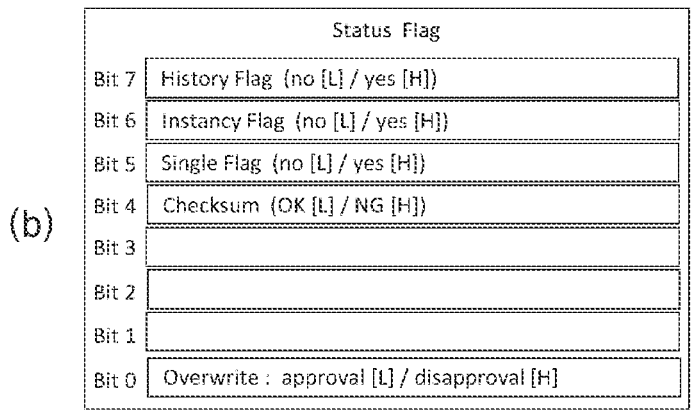

SIGNAL PROCESSING APPARATUS AND SIGNAL PROCESSING METHOD

CROSS REFERENCE TO PRIOR APPLICATION

This application is a National Stage Patent Application of PCT International Patent Application No. PCT/JP2021/011004 (filed on Mar. 18, 2021) under 35 U.S.C. § 371, which claims priority to Japanese Patent Application No. 2020-060015 (filed on Mar. 30, 2020), which are all hereby incorporated by reference in their entirety.

TECHNICAL FIELD

The present technology relates to signal processing apparatuses and signal processing methods, and more particularly to a signal processing apparatus and so forth suitable for application to a video system and others in broadcasting stations or the like.

BACKGROUND ART

In the related art, there is known a system to transmit a digital signal, which is used for transmission, including a video signal and metadata associated with the video signal. In one example, Patent Document 1 discloses a technique of transmitting a video signal and metadata associated with the video signal, with the metadata embedded in an ancillary region of a serial digital signal in SDI format.

Considering the use of a video signal for various applications, more types of metadata will be superimposed on an ancillary region of a serial digital signal from now on. In this case, the ancillary region of the serial digital signal will be flooded with many types of metadata, which causes a large amount of unnecessary or unknown metadata to be sent to certain receivers in the following stage.

Recently, an approach has been often performed to add specific metadata to a location with a given line number to allow the cooperation between a sender and a receiver. The addition of metadata for different uses with respective intentions complicates the status in the ancillary region. Thus, it is desirable for a CPU (software) to acquire all the metadata and extract the desired data among them to achieve appropriate reception.

Sending a large quantity of metadata necessitates a large region for accumulating it, which increases memory hardware. In addition, constantly scanning the ancillary region sent for each frame and identifying data make a lot of processing unnecessary and inefficient. Furthermore, switchers and video routers with multi-channel inputs require processing a lot of metadata simultaneously. Such processing operations are performed only by a CPU, imposing a significant load on the CPU.

CITATION LIST

Patent Document

Patent Document 1: Japanese Patent Application Laid-Open No. 2011-155701

SUMMARY OF THE INVENTION

Problems to be Solved by the Invention

The present technology is intended to prevent or reduce an increase in memory hardware on a transmitter or a receiver of a serial digital signal, decreasing the load on a CPU.

Solutions to Problems

A concept of the present technology lies in
a signal processing apparatus including:
a signal input unit configured to receive as an input a video signal and a digital signal for transmission, the digital signal for transmission including a data packet with metadata associated with the video signal; and
a data writing unit configured to extract predetermined metadata from the digital signal for transmission on the basis of metadata-specifying information and write the extracted metadata in an accumulating register.

According to the present technology, a signal input unit receives as an input a video signal and a digital signal for transmission, the digital signal for transmission including a data packet with metadata associated with the video signal. For example, the digital signal for transmission is a serial digital signal in SDI format, and the data packet may be embedded in an ancillary region of the serial digital signal in the SDI format. A data writing unit extracts predetermined metadata from the digital signal for transmission on the basis of metadata-specifying information and writes the extracted metadata in an accumulating register.

For example, the metadata-specifying information may include header information of the data packet with the predetermined metadata. In this case, the header information may include classification information indicating a classification for the predetermined metadata. For example, the classification information may include first classification information and second classification information, the first classification information indicating a classification for the predetermined metadata, the second classification information indicating a sub-classification under the classification by the first classification information of the predetermined metadata.

Furthermore, in this case, the header information may further include auxiliary information of the predetermined metadata, for example. For example, the auxiliary information may include information indicating that the predetermined metadata is history data.

Furthermore, for example, the auxiliary information may include information indicating that the predetermined metadata is metadata that requires instancy. In this case, for example, the data writing unit may write the predetermined metadata in a register region of the accumulating register and interrupt software, the register region being to keep holding the predetermined metadata until being read by the software.

In addition, for example, the auxiliary information may include information indicating that the predetermined metadata is a single metadata item. In this case, for example, the data writing unit may write the predetermined metadata in a register region of the accumulating register, the register region being to keep holding the predetermined metadata until being read by software.

As described above, the present technology is intended to extract the predetermined metadata from the digital signal for transmission being input on the basis of the metadata-specifying information and to write it to the accumulating register. Thus, it is possible to prevent or reduce an increase in memory hardware and decrease the load on the CPU, which reads and processes metadata from the accumulating register, even in the case of the increased metadata included in the digital signal for transmission.

Note that in present technology, for example, it may further include an information addition unit configured to add auxiliary information to the data packet upon outputting the digital signal for transmission being input in a case where the metadata included in the data packet included in the digital signal for transmission being input is history-subjected metadata, the auxiliary information indicating that the metadata included in the data packet is history data. This configuration makes it possible to immediately change the history-subjected metadata, which is included in the digital signal for transmission being input, into the history data with no intervention of software processing and no loss of any one frame.

Further, in present technology, for example, it may further include a header information extraction unit configured to extract header information of the data packet included in the digital signal for transmission being input, and a register configured to hold the extracted header information. This configuration makes it possible to check a list of metadata items included in the digital signal for transmission being input.

Furthermore, a concept of the present technology lies in a signal processing apparatus including:

a signal input unit configured to receive as an input a digital signal for transmission including a video signal; and a signal output unit configured to superimpose and output a data packet on a specified line of the digital signal for transmission being input, the data packet being to be newly superimposed and having metadata associated with the video signal, in which the signal output unit includes an end detection unit configured to detect an end of a last data packet superimposed previously on the specified line of the digital signal for transmission being input, and a data superimposition unit configured to superimpose the data packet to be newly superimposed, following the end of the last data packet superimposed previously on the specified line of the digital signal for transmission being input on the basis of the detection of the end.

In the present technology, the signal input unit receives, as an input, the digital signal for transmission including the video signal. Then, the signal output unit superimposes and outputs the data packet, which is to be newly superimposed and has the metadata associated with the video signal, on the specified line of the digital signal for transmission being input. For example, the digital signal for transmission is a serial digital signal in SDI format, and the data packet may be embedded in an ancillary region of the serial digital signal in this SDI format.

In this case, the end detection unit detects the end of the last data packet that has been superimposed on the specified line of the digital signal for transmission being input. Then a data superimposition unit superimposes the data packet to be newly superimposed, following the end of the last data packet superimposed previously on the specified line of the digital signal for transmission being input on the basis of the detection of the end.

For example, the end detection unit may definitively determine an end of a particular data packet as the end of the last data packet in a case where the end of the particular data packet is detected, and then a next data packet is not detected by lapse of a predetermined number of cycles. This configuration makes it possible to correctly detect the end of the last data packet even in the case where the next data packet is not superimposed, following the previous data packet.

Furthermore, for example, it may further include a register configured to hold information regarding a data packet to be newly superimposed, the signal output unit, in a case where the data packet to be newly superimposed may include information indicating that the metadata included in the data packet requires instancy, in a frame subsequent to superimposing one frame of the data packet to be newly superimposed, continues to superimpose the data packet to be newly superimposed by changing the information indicating that the metadata to be superimposed requires instancy into information indicating that the metadata to be superimposed does not require instancy, or continues to superimpose without the information change. This configuration makes it possible to send out metadata that has the instancy or immediacy appropriately.

Further, for example, it further includes a register configured to hold information regarding the data packet to be newly superimposed, the signal output unit, in a case where the data packet to be newly superimposed may include information indicating that the metadata included in the data packet is a single metadata item, in a frame subsequent to superimposing one frame of the data packet to be newly superimposed, make the superimposition be stopped, or continues the superimposition by changing the information indicating that the metadata is the single metadata item into information indicating that the metadata is not the single metadata item. This configuration makes it possible to send out a single metadata item appropriately.

As described above, the present technology is provided with a superimposition position automatic control function that detects the end of the last data packet that has been superimposed on the specified line of the digital signal for transmission being input and superimposes a new data packet, following the end of the data packet. Thus, using software, it is possible to superimpose the new data packet automatically at the correct position of the line to be superimposed by just specifying the information regarding the data packet to be superimposed and the line.

BRIEF DESCRIPTION OF DRAWINGS

FIG. 2 is a diagram illustrating an example of the SDI format structure of "HD-SDI/3G-SDI Level-B" and "3G-SDI Level-A/12G-SDI".

FIG. 5 is a diagram illustrating an example of the contents of various types of flag information (LPM Flag) of the 9th word.

FIG. 8 is a diagram illustrated to describe an overview of the configuration of an SDI signal input unit.

FIG. 11 is a diagram illustrating an example of the contents of information written in one register region of a packet register and status flag information.

MODE FOR CARRYING OUT THE INVENTION

Figure 1:
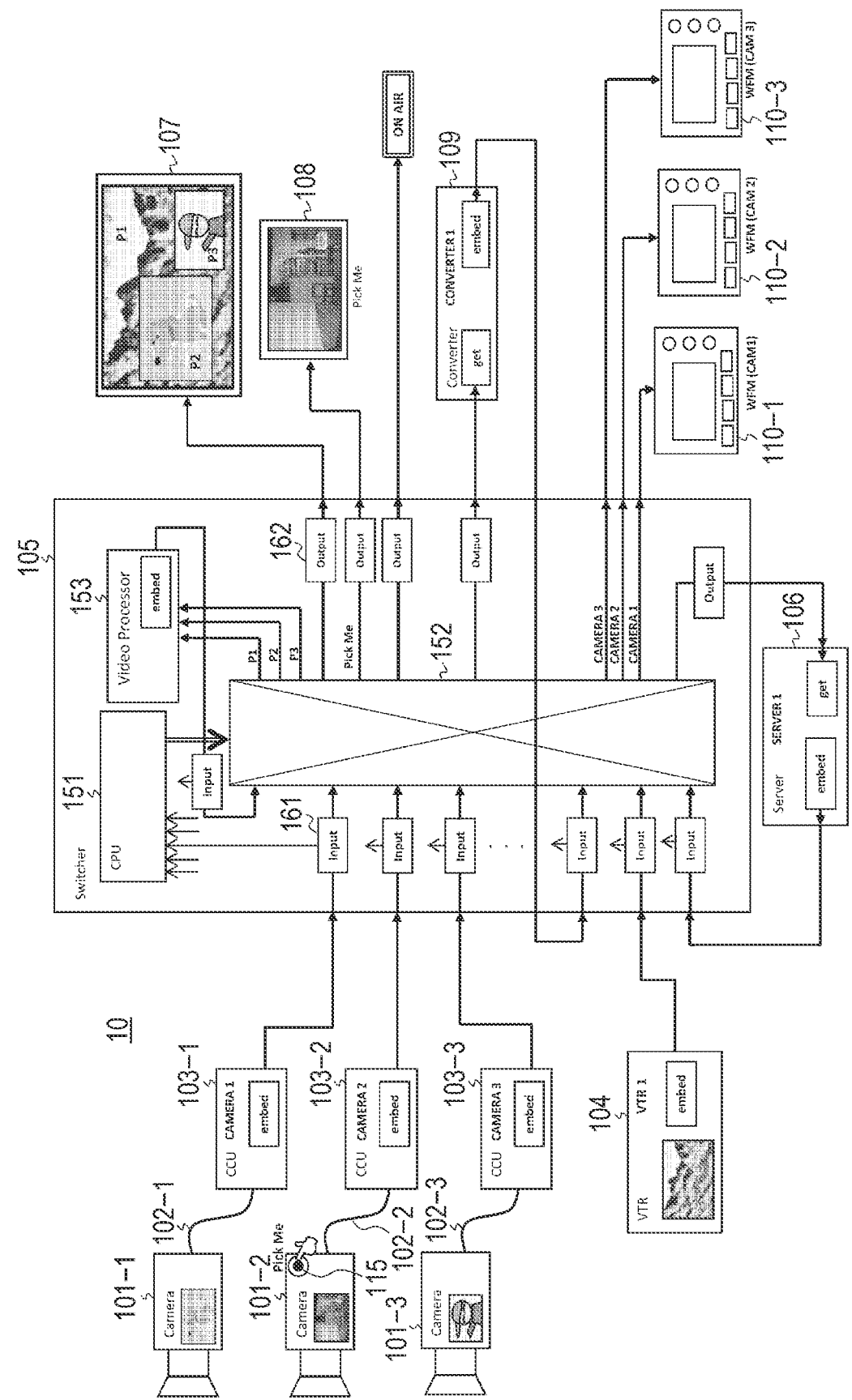
FIG. 1 is a block diagram illustrating a configuration example of a video system according to an embodiment.

Modes for carrying out the present technology (hereinafter referred to as "embodiment") are now described. Moreover, the description is given in the following order.
1. Embodiment
2. Modification 1. Embodiment Configuration Example of Video System FIG. 1 illustrates a configuration example of a video system 10 according to an embodiment. The video system system 10 includes a plurality of camera devices, a plurality of camera control units (CCUs) 103-1 to 103-3, and a video tape recorder 104. Three camera devices 101-1 to 101-3 and camera devices 101-1 to 101-3 illustrated in the figure are connected to the CCUs 103-1 to 103-3 via cables 102-1 to 102-3, respectively.

Further, the video system 10 includes a switcher 105, a server 106, monitors 107 and 108, a converter 109, and a plurality of waveform monitors (WFMs). This example illustrates three waveform monitors 110-1 to 110-3.

The CCU 103 (103-1 to 103-3) generates and outputs a digital signal for transmission including a video signal supplied from the camera device 101 (101-1 to 101-3) via the cable 102 (102-1 to 102-3). The CCU 103 incorporates metadata associated with the video signal into the digital signal for transmission. In the present embodiment, the digital signal for transmission is a serial digital signal in a serial digital interface (SDI) format (hereinafter appropriately referred to as "SDI signal"). The SDI signal has an ancillary region into which a data packet having metadata is embedded. Moreover, in the illustrated example, "embe" indicates that the metadata is embedded in the ancillary region of the SDI signal.

Examples of the metadata embedded in the ancillary region of the SDI signal in the CCU 103 include lens information, live-purpose metadata, and the like. The live-purpose metadata is herein the metadata used in a series of workflows for live video production. More specifically, the live-purpose metadata is the metadata used for controlling various equipment or executing applications for the use of necessitating the acquisition, checking, and reflection of data in real-time, in addition to recording and transmitting data such as video. The live-purpose metadata includes camera setting data that puts together camera paint settings or the like, data that puts together settings that decide the relation between high dynamic range (HDR) signal and standard dynamic range (SDR) signal, data that puts together settings required for down-conversion of video signals, data that puts together various types of environmental data related to cameras, data that puts together various types of identification information added to the video signal, and so on.

Example of SDI Format Structure

FIG. 2(a) illustrates an example of the SDI format structure of "HD-SDI/3G-SDI Level-B" (hereinafter appropriately referred to as "level-B SDI format structure"). In addition, FIG. 2(b) illustrates an example of the SDI format structure of "3G-SDI Level-A/12G-SDI" (hereinafter appropriately referred to as "level-A SDI format structure").

In the level-B SDI format structure example illustrated in FIG. 2(a), lines 9 to 20, and 571 to 583 are vertical ancillary (VANC) regions. On lines 9, 571, and 572, lens metadata (Lens Metadata, illustrated in the figure) is superimposed. On lines 11 and 574, material transmission auxiliary data defined in ARIB TR-B22 is superimposed.

On lines 19 and 582, digital closed caption data defined in ARIB STD-B37 is superimposed. On lines 20 and 583, the inter-broadcasting station control signal defined in ARIB STD-B39 and the data broadcasting trigger signal defined in ARIB STD-B35 are superimposed.

Further, in the level-B SDI format structure example, various types of live-purpose metadata are superimposed on lines 14, 15, and 16. In this format, "Camera Paint Metadata" indicates camera setting data that puts together paint settings and the like of cameras. "HDR SDR Relation Metadata" indicates data that puts together the settings that decide the interrelationship between the high dynamic range (HDR) signal and the standard dynamic range (SDR) signal. "Down Conv Setting Metadata" indicates data that puts together the settings required for down-conversion of the video signal. "Camera Trace Metadata" indicates data that puts together various types of environmental data relating to cameras. "ID Group Metadata" indicates data that puts together various types of identification information added to the video signal.

Moreover, the line on which the live-purpose metadata is superimposed is not limited to lines 14, 15, and 16 and can be superimposed on other lines. In addition, not all types of live-purpose metadata to be superimposed are illustrated in the figure, and some are likely to be unillustrated. Furthermore, it is also possible that other types of live-purpose metadata are superimposed.

In the level-A SDI format structure example illustrated in FIG. 2(b), lines 9 to 41 are the VANC regions. On line 9, lens metadata (Lens Metadata, illustrated in the figure) is superimposed. On line 11, material transmission auxiliary data defined in ARIB TR-B22 is superimposed. Moreover, for example, the material transmission auxiliary data also can be superimposed on line 32 or 40, as illustrated in the figure.

On line 19, digital closed caption data defined in ARIB STD-B37 is superimposed. On line 20, the inter-broadcasting station control signal defined in ARIB STD-B39 and the data broadcasting trigger signal defined in ARIB STD-B35 are superimposed. Moreover, for example, the inter-broadcasting station control signal or the data broadcasting trigger signal can be superimposed on line 41, as illustrated in the figure.

Further, in the level-A SDI format structure example, various types of live-purpose metadata are superimposed on lines 14, 15, and 16, similarly to the level-B SDI format structure example (see FIG. 2(a)).

Detailed Configuration Example of Camera Device and CCU

Figure 3:
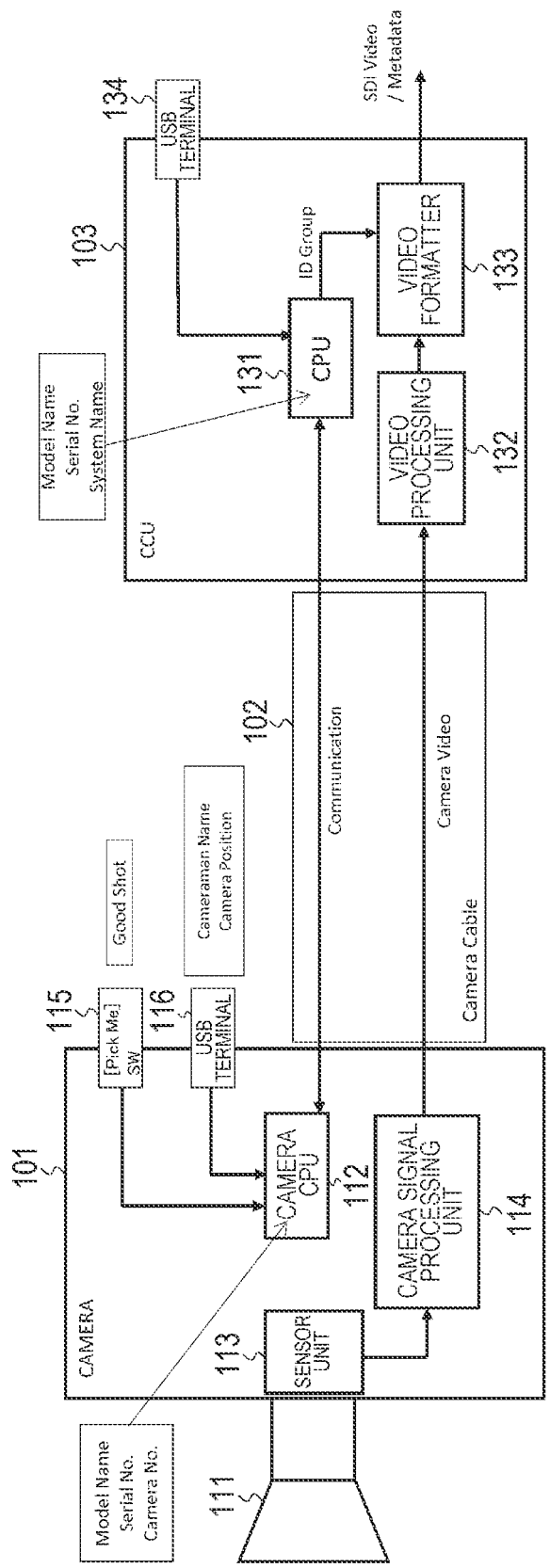
FIG. 3 is a block diagram illustrating a detailed configuration example of a camera device and a CCU.

FIG. 3 illustrates a detailed configuration example of the camera device 101 and the CCU 103. The camera device 101 is connected to the CCU 103 via the cable 102. The camera device 101 is connected to a lens device 111. The lens device 111 is attached to a lens mount portion at the front of the camera device 101.

The camera device 101 includes a camera CPU 112, a sensor unit 113, a camera signal processing unit 114, a pick-me switch (Pick Me SW, as illustrated) 115, and a USB terminal 116. In addition, the CCU 103 includes a CPU 131, a video processing unit 132, a video formatter 133, and a USB terminal 134.

The camera CPU 112 controls the operation of each component in the camera device 101. The camera CPU 112 communicates necessary signals with the CPU 131 of the CCU 103. In one example, the camera CPU 112 manages information such as model name, serial number, and camera number of the camera device 101 and sends such information to the CPU 131 of the CCU 103 through a communication line of the cable 102.

Further, for example, the camera CPU 112 acquires information such as the cameraman's name and camera position from USB memory (not illustrated) attached to the USB terminal 116 and sends such information to the CPU 131 of the CCU 103 through the communication line of the cable 102. In addition, for example, the camera CPU 112 detects that a cameraman has pressed the pick-me switch (Pick Me SW) 115 upon good-shot shooting and sends the detection signal to the CPU 131 of the CCU 103 through the communication line of the cable 102.

The sensor unit 113 has an image sensor with a resolution of HD, 4K, 8K, or the like and outputs an image-capturing video signal corresponding to a subject to be captured. The lens device 111 described above forms an image of a subject on the image-capturing surface of the image sensor. The camera signal processing unit 114 subjects the image-capturing video signal output from the sensor unit 113 to the processing such as gain control, white balancing, and gamma correction, for example. The camera signal processing unit 114 outputs and sends the camera video signal as the output of the camera device 101 to the video processing unit 132 of the CCU 103 through the video line of the cable 102.

The CPU 131 controls the operation of each component in the CCU 103. The CPU 131 communicates necessary signals with the camera CPU 112 of the camera device 101. The video processing unit 132 subjects the camera video signal sent from the camera device 101 through a video line of the cable 102 to the processing such as color correction and outputs the processed video signal.

The video formatter 133 generates and outputs a digital signal for transmission including a video signal output from the video processing unit 132. The digital signal for transmission is herein a serial digital signal in SDI format (SDI signal).

The CPU 131 manages information such as model name, serial number, and system name of the CCU 103. The CPU 131 generates metadata of "ID Group Metadata" that puts together various types of identification information to be added to the video signal as metadata relating to the video signal output from the video processing unit 132 on the basis of the managed information and the information sent from the camera device 101 as described above. The video formatter 133 embeds the metadata of "ID Group Metadata" in the ancillary region of the SDI signal. Moreover, although the detailed description is omitted, the video formatter 133 embeds other necessary metadata such as lens information and live-purpose metadata in the ancillary region of the SDI signal.

Configuration Example of Data Packet (Ancillary Packet)

Figure 4:
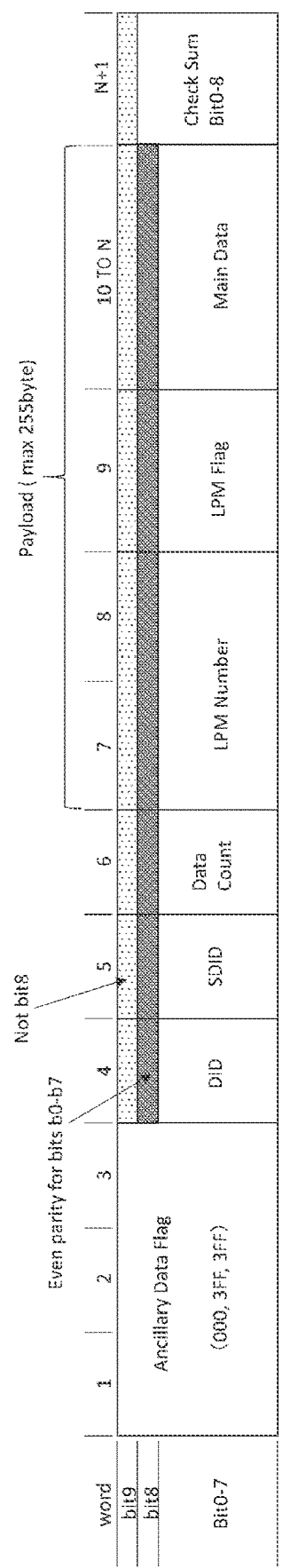
FIG. 4 is a diagram illustrating a configuration example of a data packet embedded in an ancillary region (ancillary packet) of an SDI signal.

FIG. 4 illustrates a configuration example of a data packet embedded in an ancillary region (ancillary packet) of an SDI signal. This data packet includes the 1st through N+1th words. The 1st through 3rd words indicate the beginning of the packet and are an ancillary data flag (ADF). The 4th word is a data ID (DID) of the packet. The 5th word is a secondary data ID (SDID) of the packet. The 6th word is a data count (Data Count, as illustrated) indicating the number of words N of the payload. The 7th and 8th words are number information (live production metadata; LPM Number, as illustrated) indicating the data type for live-purpose metadata. The 9th word is various types of flag information (LPM Flag, as illustrated). The 10th through Nth words are main data words (Main Data, as illustrated) including metadata. The N+1th word is a checksum (Check Sum, as illustrated).

In this data packet, the ancillary data flag (ADF), data ID (DID), secondary data ID (SDID), and data count (Data Count) are included in the header. The number information (LPM Number), various types of flag information (LPM Flag), and main data word (Main Data Word) are included in the payload. In this data packet, the maximum of N is 255, i.e., the maximum number of words in the payload is 255 words.

In this data packet, each word includes 10 bits from bit 0 to bit 9. The ancillary data flag (ADF) indicates the three-word value of "000 3FF 3FF h". In this data packet, the 8th bit of each of the 4th through Nth words is even parity for the 0th through 7th bits of each word. In addition, in this data packet, the 9th bit of the 4th through N+1th words is the inversion of the 8th bit, that is, "not bit 8".

In the case where the data ID (DID) and the secondary data ID (SDID) indicate the classification of live-purpose metadata, the payload includes the number information (LPM Number) and the various types of flag information (LPM Flag). In this case, if the data ID (DID) and the secondary data ID (SDID) indicate the classification of the live-purpose metadata, for example, the values of "53 01 h", "53 02 h", and "53 03 h" are illustrated.

Moreover, if the data ID (DID) and the secondary data ID (SDID) do not indicate the classification of the live-purpose metadata, the payload includes only the main data (Main Data Word).

The number information (LPM Number) indicates the sub-classification under the classification by the data ID (DID) and the secondary data ID (SDID) of the live-purpose metadata. The use of the number information in this way makes it possible to handle the live-purpose metadata as table data. Moreover, the upper 8 bits of the LPM Number (2 bytes) are referred to as "Live Meta U", and the lower 8 bits thereof are referred to as "Live Meta D".

In one example, in the case where the live-purpose metadata is the camera setting data that puts together the paint settings and the like of the camera, the number information (LPM Number) indicates "01 00 h". In addition, for example, in the case where the live-purpose metadata is data that puts together the settings for deciding the interrelationship between the high dynamic range (HDR) signal and the standard dynamic range (SDR) signal, the number information (LPM Number) is "02 00 h".

Further, for example, in the case where the live-purpose metadata is data that puts together the settings required for down-conversion of the video signal, the number information (LPM Number) indicates "03 00 h". In addition, for example, in the case where the live-purpose metadata is data that puts together various types of environmental data relating to the camera, the number information (LPM Number) indicates "04 00 h". In addition, for example, in the case where the live-purpose metadata is data that puts together various types of identification information added to the video signal, the number information (LPM Number) indicates "10 01/10 02/10 03/10 04 h".

FIG. 5 illustrates an example of the contents of various types of flag information (LPM Flag) of the 9th word. The various types of flag information (LPM Flag) constitute the auxiliary information of the metadata. In this flag, the 7th bit is a "history" flag indicating that the metadata is history data. In one example, the value "0" indicates that the metadata is not history data, that is, it is valid latest data, and "1" indicates that the metadata is history data.

In the case where there is a change in the data contents of the metadata and, if upon duplicating the latest metadata, the original metadata remains or it is intended to be kept as the history data even though it is no longer valuable as live-purpose metadata, the "history" flag is set, that is, the value is set to "1".

In one example, in duplicating the pick-me signal or the like (a signal from a cameraman telling a director that an important video is being captured) with the video signal as live-purpose metadata, this signal is meaningful to use in real-time, but once it is recorded and then played back, making the pick-me operation relatively less meaningful. However, linking it with the reproduction video signal makes it possible for the signal to be used as information indicating that the possibility of an important scene is added. In other words, using it as the history data indicating that the pick-me operation is performed is meaningful, so the metadata to be superimposed on the reproduction video signal is set as the "history" flag for discrimination.

The 6th bit is an "Instancy" flag indicating that the metadata requires instancy (urgency). In one example, the value "0" indicates that the metadata does not require instancy, and "1" indicates that the metadata requires instancy. If the metadata is important and requires instancy, this "Instancy" flag is set, i.e., the value is set to "1".

The "Instancy" flag requires (desires) the instancy in metadata processing for the following stage, but it does not guarantee that it performs immediate processing in the following stage. In other words, the processing in the following stage (receiver) is determined depending on the circumstance of the following stage, so the determination fails to be performed in the previous stage (transmitter).

In the pick-me operation or the like mentioned above, the pick-me operation is often a decisive moment and often requires instancy, so the "Instancy" flag is set. Moreover, as described later, the circuit configuration on the receiver makes it possible to detect this "Instancy" flag information by hardware and interrupt the CPU or the like.

The 5th bit is a "Single" flag indicating that the metadata is a single metadata item. In one example, the value "0" indicates that the metadata is not a single metadata item, and "1" indicates that the metadata is a single metadata item.

Normally, the metadata is duplicated every frame, but if a single metadata item is transmitted, the relaying or loss in the following stage is liable to occur. To avoid this, the "Single" flag is set, i.e., the value is set to "1", if the metadata indicates it is important and single (valuable).

Further, even in the case where the metadata is transmitted continuously every frame, if there is a change in the data contents and the data contents at the moment of the change are unintended to be lost in the following stage, the "Single" flag is set, and it can be handled as a single metadata item.

This "Single" flag requires (desires) the certainty of the metadata retrieve processing from the following stage, but this does not guarantee that the loss of data does not occur in the following stage. In other words, the processing in the following stage (receiver) is determined depending on the circumstance of the following stage, so the determination fails to be performed in the previous stage (transmitter).

The 1st and 0th bits are flags indicating the size information of the metadata (table data). This size information is used to classify the size of the metadata by large (L), middle (M), and small (S). In one example, the value "00" indicates large (L), i.e., a maximum of 252 bytes (max 252 byte). The value "01" indicates middle (M), i.e., a maximum of 119 bytes (max 119 byte). The value "10" indicates small (S), i.e., a maximum of 55 bytes (max 55 byte).

The size information is intended to have the possibility of reducing the memory area required by the receiver. In the case where the maximum number of bytes in the payload of the data packet (ancillary packet) is 255 bytes, and a lot of metadata is necessary to be handled, the memory area of (255+α) bytes is typically required for each metadata. However, adding the size information to the metadata (table data) makes it possible for the receiver to allocate a small-sized memory area to it upon handling small-sized metadata, which gives the possibility of reducing the memory area of the entire memory area prepared by the receiver. In addition, in this case, it is also possible to have the possibility of reducing the entire memory area prepared by the transmitter, similarly to the receiver.

Referring again to FIG. 1, the video tape recorder 104 outputs the SDI signal that includes the video signal during playback. This SDI signal also includes the metadata associated with the video signal included in the SDI signal, similarly to the SDI signal output from the CCUs 103-1 to 103-3 described above.

The switcher 105 receives as an input the SDI signal output from the CCUs 103-1 to 103-3 or the video tape recorder 104. The switcher 105 outputs the SDI signal for displaying an image to the monitor 107 and the monitor 108, outputs an SDI signal for on-air, and outputs a predetermined SDI signal to the waveform monitors 110-1 to 110-3.

Further, the switcher 105 outputs a predetermined SDI signal to the converter 109. The SDI signal that is input to the converter 109 is subjected to the conversion processing and then is feedback to the input of the switcher 105 again. The converter 109 extracts metadata from the ancillary region of the SDI signal upon input and embeds metadata again in the ancillary region of the SDI signal upon output. Moreover, in the illustrated example, "get" indicates that the metadata is extracted from the ancillary region of the SDI signal, and "embe" indicates that the metadata is embedded in the ancillary region of the SDI signal.

Further, the switcher 105 outputs a predetermined SDI signal to the server 106. Further, the SDI signal played back by the server 106 is subjected to the input of the switcher 105. The server 106 extracts metadata from the ancillary region of the SDI signal upon input and embeds metadata in the ancillary region of the SDI signal upon output. Moreover, in the illustrated example, "get" indicates that the metadata is extracted from the ancillary region of the SDI signal, and "embe" indicates that the metadata is embedded in the ancillary region of the SDI signal.

The switcher 105 has a CPU 151 implemented as software, a router 152, and a video processor 153. The CPU 151 controls the operation of each component in the switcher 105. The SDI signal input to the switcher 105 from the CCUs 103-1 to 103-3 or the video tape recorder 104 is input to the router 152. In addition, the SDI signal that is input from the converter 109 or the server 106 to the switcher 105 is input to the router.

Further, the predetermined SDI signal that is output from the router 152 is input to the video processor 153, and the SDI signal processed by the video processor 153 is input to the router 152. An identification information group is embedded in the ancillary region of the SDI signal output from the video processor 153 in this way. Moreover, in the illustrated example, "embe" indicates that the metadata is embedded in the ancillary region of the SDI signal.

The metadata is extracted from the ancillary region of each of the SDI signals input to the router 152 and held in a register, then is read by the CPU 151. The CPU 151 discriminates an output destination of each of the SDI signals input to the router 152 on the basis of the metadata used as the identification information of the SDI signals and controls the router 152 on the basis of the discrimination result. This configuration allows each output unit of the router 152 to be capable of outputting an appropriate SDI signal.

In this case, the CPU 151 discriminates an output destination of each SDI signal on the basis of an association table between the identification information preset by the user operation and the output destination and controls the router 152, for example. In one example, this example illustrates the association table in which output units P1, P2, and P3 of the router 152 for supplying the SDI signal to the video processor 153 are associated with the identification information of "VTR 1", "CAMERA 1", and "CAMERA 2", respectively. Thus, the CPU 151 controls the routing of the router 152 in such a way that the SDI signal from the video tape recorder 104, the SDI signal from the CCU 103-2, and the SDI signal from the CCU 103-4 are output to the output units P1, P2, and P3 of the router 152, respectively.

Further, for example, although the description of the association table is omitted, the CPU 151 controls the router 152 in such a way that the SDI signal from the CCU 103-1, the SDI signal from the CCU 103-2, and the SDI signal from the CCU 103-3 are output to the corresponding output units of the router 152 to which the waveform monitors 110-1, 110-2, and 110-3 are connected, on the basis of the identification information of the camera number.

Further, for example, although the description of the association table is omitted, the CPU 151 controls the router 152 in such a way that the SDI signal with the pick-me identification information to the output unit of the router 152 to which the monitor 108 is connected. This configuration allows the monitor 108 to be capable of displaying the captured image of the camera device 101 in which the cameraman presses the pick-me switch (Pick Me SW) 115.

Further, the CPU 151 may control the router 152 in such a way that the SDI signal with the pick-me identification information to the output unit of the router 152 to which a storage (not illustrated) is connected. This configuration allows the storage to record the captured image of the camera device 101 in which the cameraman presses the pick-me switch (Pick Me SW) 115.

Further, for example, although the description of the association table is omitted, the CPU 151 controls the router 152 in such a way that the SDI signal obtained by the video processor 153 is output to the output unit of the router 152 to which the monitor 107 is connected, on the basis of the identification information indicating the role name (e.g., the output unit (P1, P2, P3)). This configuration allows the monitor 107 to be capable of displaying a processed image based on the SDI signal obtained by the video processor 153, i.e., a picture-in-picture image in the illustrated example.

Further, for example, although the description of the association table is omitted, the CPU 151 controls the router 152 in such a way that the SDI signal obtained by the video processor 153 is output to the output unit of the router 152 that should output the SDI signal for on-air. This configuration allows the SDI signal obtained by the video processor 153 to be output as the SDI signal for on-air.

In the switcher 105, the input unit (Input, as illustrated) 161 implemented by hardware extracts the metadata from the ancillary region of the SDI signal input to the router 152. In addition, the output unit (Output, as illustrated) 162 implemented by hardware embeds the metadata in the ancillary region of the SDI signal output from the router 152. The detailed configuration of the input unit (Input) 161 and the output unit (Output) 162 will be described later.

Figure 6:
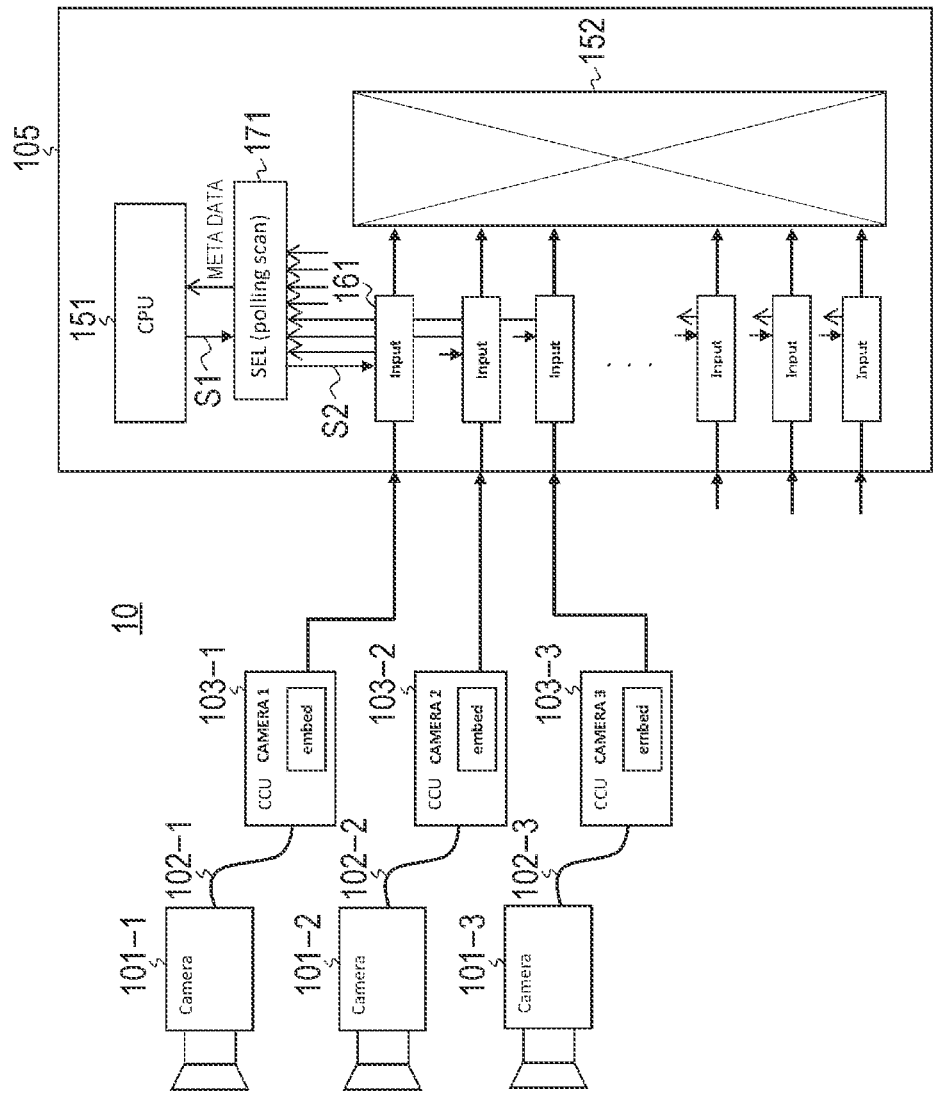
FIG. 6 is a diagram illustrated to describe an operation in the case of setting a "Single" flag as auxiliary information of metadata.

The description is briefly given of the operation of the switcher 105 in the case where the "Single" flag is set as the auxiliary information of the metadata with reference to FIG. 6. The input unit (Input) 161 of each channel extracts the metadata sent every frame and stores it in a register. The CPU 151 reads the metadata stored in the register in each input unit (Input) 161. The register region implemented by hardware in each input unit (Input) 161 has a limited capacity, and so typically, it has the structure that is refreshed every frame and is overwritten by the metadata of the next frame.

In a multi-channel input device such as the switcher 105, in the case where it is difficult for the CPU 151 to acquire all the metadata for each frame, in some cases, the CPU 151 sends a scan control signal S1 to a selector 171, and accordingly, the selector 171 sends a scan control signal to each input unit (Input) 161 sequentially, scans each input unit (Input) 161 by polling, and so the CPU 151 acquires metadata sequentially.

Further, in the case where the metadata is sequentially read from each input unit (Input) 161 in accordance with the timing of the CPU 151, if the readout interval of each input unit (Input) 161 is longer than the frame rate, it is not possible to completely acquire metadata at each frame. In such a case, in the case where the metadata is sent one time, if the timing of acquiring the metadata from the CPU 151 is not met, the metadata sent only once is overwritten by others and lost.

Thus, the metadata that is intended not to be lost is set as the "Single" flag and sent. In this case, if the hardware of the input unit (Input) 161 is provided with a "Single" flag detection function and the "Single" flag is set, the metadata is stored in a region of the register that is not automatically overwritten. This register region is reset by reading data from the CPU 151 and can be reused as an empty region of the register.

Figure 7:
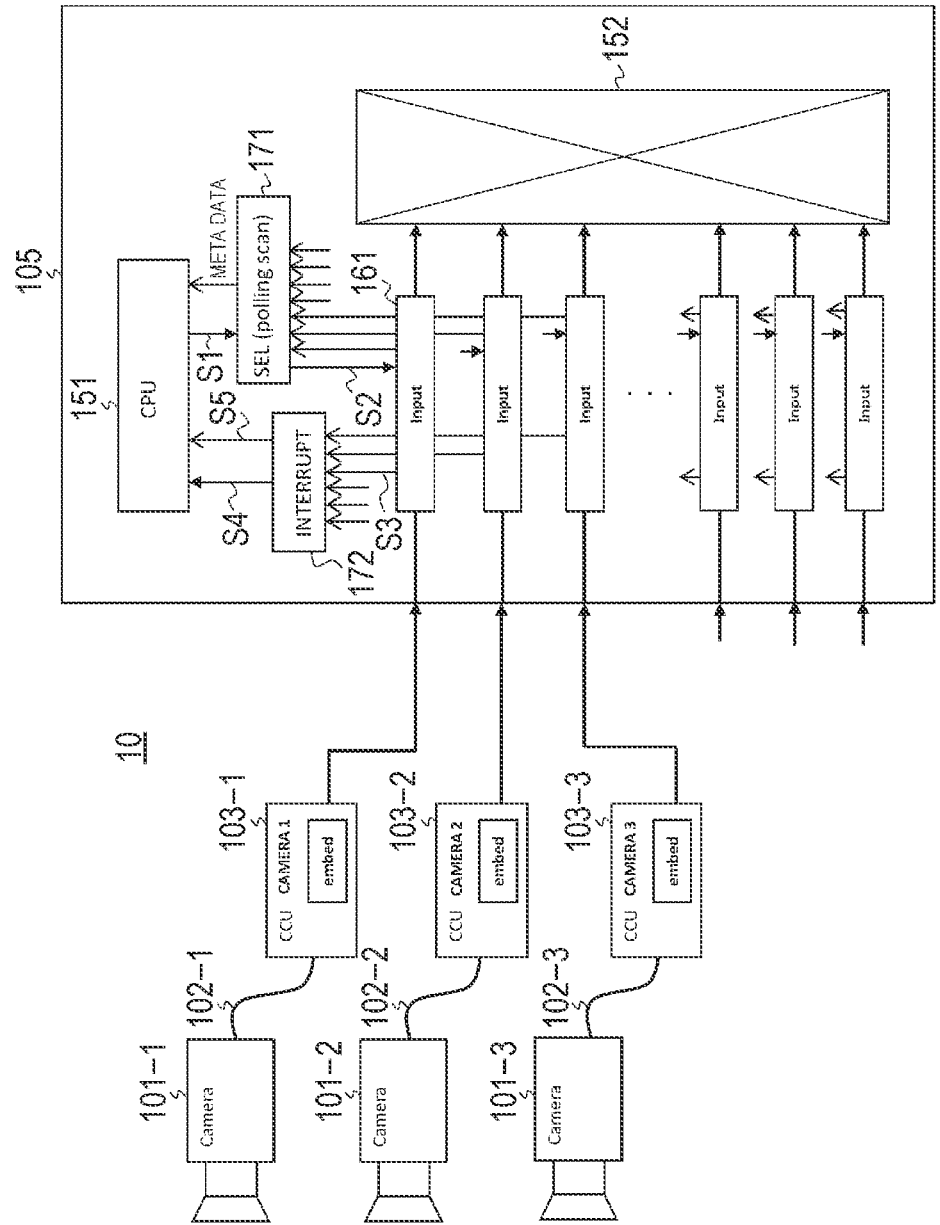
FIG. 7 is a diagram illustrated to describe an operation in the case of setting an "Instancy" flag as auxiliary information of metadata.

The description is briefly given of the operation of the switcher in the case where the "Instancy" flag is set as the auxiliary information of the metadata with reference to FIG. 7. The input unit (Input) 161 of each channel extracts the metadata sent every frame and stores it in a register. The CPU 151 reads the metadata stored in the register in each input unit (Input) 161. The register region implemented by hardware in each input unit (Input) 161 has a limited capacity, and so typically, it has the structure that is refreshed every frame and is overwritten by the metadata of the next frame.

In a multi-channel input device such as the switcher 105, in the case where it is difficult for the CPU 151 to acquire all the metadata for each frame, in some cases, the CPU 151 sends a scan control signal S1 to a selector 171, and accordingly, the selector 171 sends a scan control signal to each input unit (Input) 161 sequentially, scans each input unit (Input) 161 by polling, and so the CPU 151 acquires metadata sequentially. In such a case, if time-critical metadata is sent, the acquisition of the data is sometimes delayed.

Thus, the time-critical metadata is set as the "Instancy" flag and sent. In this case, if the hardware of the input unit (Input) 161 is provided with a "Instancy" flag detection function and the "Instancy" flag is set, the metadata is stored in a region of the register that is not automatically overwritten. In addition, in this case, a detection signal S3 of the "Instancy" flag is sent to an interrupt circuit 172, and an interrupt signal S4 and an interrupt channel number S5 are sent from the interrupt circuit 172 to the CPU 151. This allows the CPU 151 to acquire the metadata of the interrupted channel preferentially.

Configuration Example of Input Unit

FIG. 8(*a*) illustrates an example of an overview of the configuration of an SDI signal input unit. The SDI signal being input is supplied to a video processing circuit 182 through a metadata extraction unit 181. The metadata extraction unit 181 extracts all data packets (ancillary packets) from the VANC region of the SDI signal and writes the contents of the data packet (header information and metadata) in a metadata register 183. Then, the CPU 184 reads and processes the contents of the data packet written in the metadata register 183.

In the case of the configuration illustrated in FIG. 8(*a*), all the data packets in the VANC region are extracted, and the contents of the data packets are written in the metadata register 183. Thus, in the case where the number of data packets placed in the VANC region increases, the metadata register 183 requires a large capacity, and the processing load on the CPU 184 also increases.

FIG. 8(*b*) illustrates another example of an overview of the configuration of an SDI signal input unit. The SDI signal being input is supplied to a video processing circuit 192 through a metadata extraction unit 191. A CPU 193 sets metadata-specifying information (line information, header information) used to specify the required metadata to a metadata-specifying unit 194. The metadata extraction unit 191 extracts data packets (ancillary packets) specified using the specifying information of the metadata-specifying unit 194 from the VANC region of the SDI signal and writes the contents of the data packet (header information and metadata) in a metadata register 195. Then, the CPU 193 reads and processes the contents of the data packet written in the metadata register 195.

In the case of the configuration illustrated in FIG. 8(*b*), not all the data packets in the VANC region but the data packets specified as required by the CPU 193 are extracted and the contents of the data packets are written in the metadata register 195. Thus, even in the case where the number of data packets placed in the VANC region increases, the capacity of the metadata register 195 can be kept small, so reducing the processing load on the CPU 193.

Figure 9:
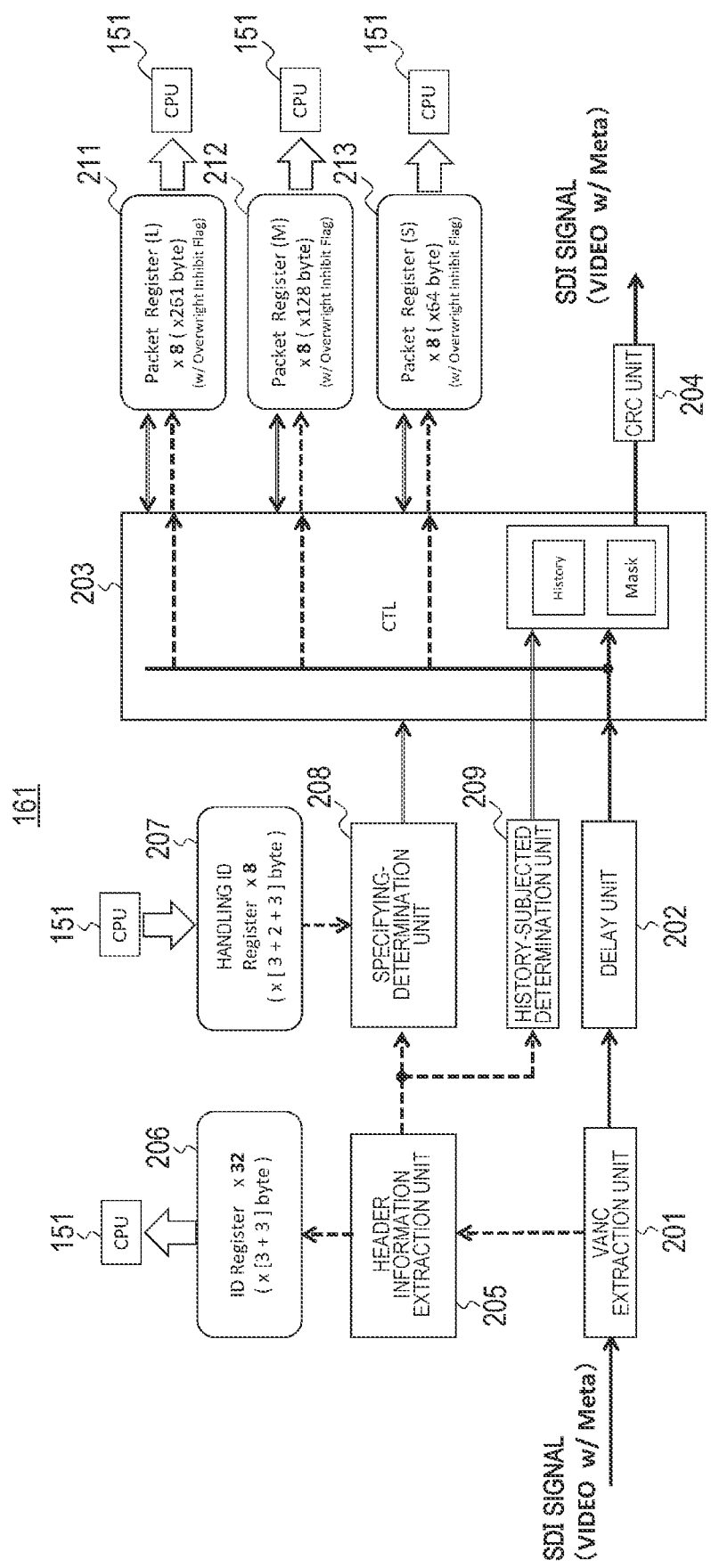
FIG. 9 is a block diagram illustrating a configuration example of an input unit (Input).

FIG. 9 illustrates a configuration example of the input unit (Input) 161 (see FIG. 1). This configuration example is based on the configuration illustrated in FIG. 8(*b*). This configuration example is implemented by, for example, a programmable logic device (PLD).

The input unit (Input) 161 includes a VANC extraction unit 201, a delay unit 202, a controller 203, a cyclic redundancy check (CRC) unit 204, a header information extraction unit 205, an ID register 206, and a handling ID register 208, a specifying-determination unit 207, a history-subjected determination unit 209, and packet registers 211, 212, and 213.

The VANC extraction unit 201 extracts a signal of the VANC region in the SDI signal being input. The delay unit 202 delays the SDI signal (same as the SDI signal being input) output from the VANC extraction unit 201 and inputs the delayed signal to the controller 203. In this case, the SDI signal is given with a delay time for timing adjustment, which is required for metadata-specifying determination or the like.

The header information extraction unit 205 detects all data packets (ancillary packets) (see FIG. 4) embedded in the VANC region from the signals in the VANC region extracted by the VANC extraction unit 201. The header information extraction unit 205 extracts header information (DID, SDID, Data Count, LPM Number, LPM Flag) included in the data packets and writes them in the ID register 206.

Figure 10:
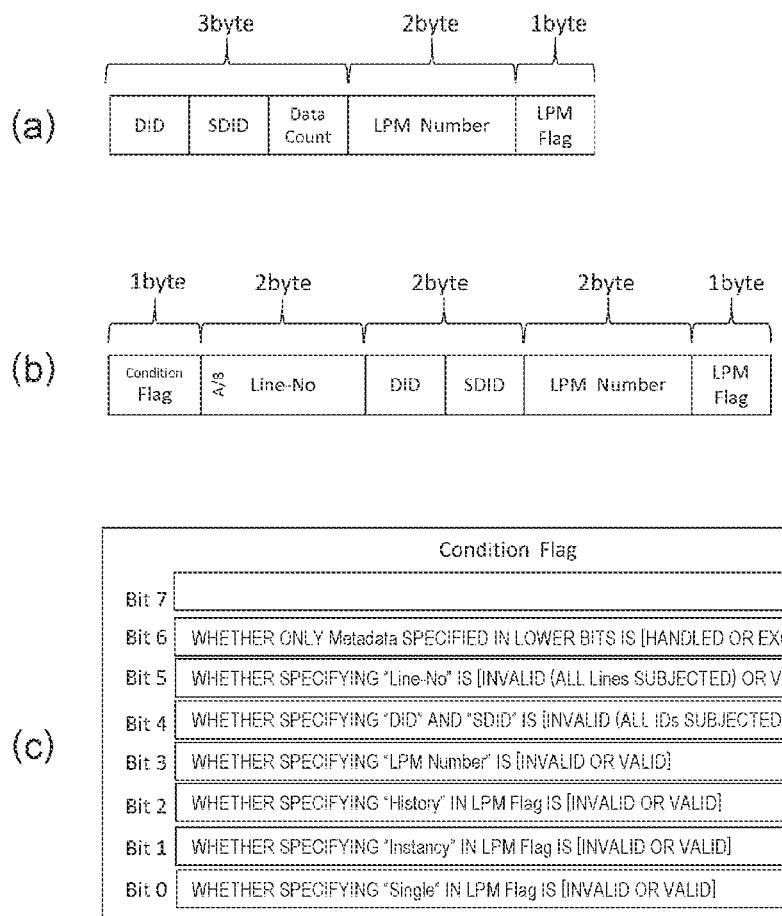
FIG. 10 is a diagram illustrating an example of the contents of information written in an ID register, information written in a handling ID register, and condition flag information.

In this embodiment, the ID register 206 has a region in which the header information of 32 data packets can be written. In this case, the header information of up to 32 data packets can be written in the ID register 206 for each frame. Herein, for the register region of the header information of one data packet, 6 (=3+3) bytes are prepared, and the information as illustrated in FIG. 10(*a*) is written.

In other words, in the byte register region, 1-byte data ID (DID), 1-byte secondary data ID (SDID), 1-byte data count (Data Count), 2-byte number information (LPM Number), and 1-byte various types of flag information (LPM Flag) are written.

The CPU 151 is capable of reading and processing the header information of each data packet, which is written in the ID register 206. This configuration makes it possible for the CPU 151 to check a list in which what type of metadata is superimposed on which line in the VANC region. Although not illustrated, the CPU 151 allows the list to be displayed on the display unit to present the list to the user.

Referring again to FIG. 9, the handling ID register 207 is set with the metadata-specifying information indicating which metadata is to be extracted from various types of metadata superimposed on the VANC region. This setting is made by the CPU 151.

In this embodiment, the handling ID register 207 has a region in which eight pieces of the metadata-specifying information can be written. Herein, for a register region for one piece of the metadata-specifying information, 8 (=3+2+3) bytes are prepared, and the information items as illustrated in FIG. 10(*b*) are written.

In other words, the 8-byte register region is the region for writing, including 1-byte condition flag (Condition Flag, as illustrated) information, 2-byte line number (Line-No., as illustrated), 1-byte data ID (DID), 1-byte secondary data ID (SDID), 2-byte number information (LPM Number), and 1-byte various types of flag information (LPM Flag).

FIG. 10(*c*) illustrates an example of the contents of the condition flag (Condition Flag) information. Herein, the 6th bit is a flag indicating whether to handle only the metadata specified by the 5th bit or lower or exclude only the metadata specified by the 5th bit or lower. In one example, the value "0" indicates to handle, and "1" indicates to exclude.

The 5th bit indicates whether specifying the line number (Line-No.) is invalid or valid. In one example, the value "0" indicates invalid, and "1" indicates valid. In the case of being invalid, all lines are subjected. The 4th bit indicates whether specifying the data ID (DID) and the secondary data ID (SDID) is invalid or valid. In one example, the value "0" indicates invalid, and "1" indicates valid. The 3rd bit indicates whether specifying the number information (LPM Number) is invalid or valid. In one example, the value "0" indicates invalid, and "1" indicates valid.

The 2nd bit indicates whether specifying the "history" flag in the various types of flag information (LPM Flag) is invalid or valid. In one example, the value "0" indicates invalid, and "1" indicates valid. The 1st bit indicates whether specifying the "Instancy" flag in the various types of flag information (LPM Flag) is invalid or valid. In one example, the value "0" indicates invalid, and "1" indicates valid. The 0th bit indicates whether specifying the "Single" flag in the various types of flag information (LPM Flag) is invalid or valid. In one example, the value "0" indicates invalid, and "1" indicates valid.

Further, referring again to FIG. 9, the specifying-determination unit 208 determines whether or not the metadata included in the data packet having the header information extracted by the header information extraction unit 205 satisfies the metadata-specifying information set in the handling ID register 207 on the basis of the header information sequentially extracted by the header information extraction unit 205 and the line information in which the data packet having the header information is embedded.

In the case of determining that the metadata satisfies the metadata-specifying information, the specifying-determination unit 208 sends a write control signal to the controller 203 in such a way as to write the header information and the metadata included in the data packet in the register. In addition, in the case of sending the write control signal to the controller 203, the specifying-determination unit 208 also sends the size information (information of L, M, S) of the metadata (table data) indicated by the 1st and 0th bits of the LPM Flag in the header information to the controller 203. Furthermore, in the case where the "Instancy" flag of the 6th bit in the LPM Flag is set or the "Single" flag of the 5th bit is set, information indicating this status is also sent to the controller 203.

The packet register (L) 211 is the register for writing the metadata, which satisfies the metadata-specifying information, and the header information, which corresponds to the metadata, as described above. In this embodiment, the packet register 211 has eight register regions to enable the writing of eight pieces of metadata, and 261 bytes are prepared for one register region. In other words, the packet register 211 is used to write the metadata in the case where the size information of the metadata (table data) indicated by the 1st and 0th bits of the LPM Flag is large (L), that is, a maximum of 252 bytes (max 252 byte). The CPU 151 is capable of reading and processing the metadata written in the packet register 211.

The packet register (M) 212 is also the register for writing the metadata, which satisfies the metadata-specifying information, and the header information, which corresponds to the metadata, as described above. In this embodiment, the packet register 212 has six register regions to enable the writing of eight pieces of metadata, and 128 bytes are prepared for one register region. In other words, the packet register 212 is used to write the metadata in the case where the size information of the metadata (table data) indicated by the 1st and 0th bits of the LPM Flag is middle (M), that is, a maximum of 119 bytes (max 119 byte). The CPU 151 is capable of reading and processing the metadata written in the packet register 212.

The packet register (S) 213 is also the register for writing the metadata, which satisfies the metadata-specifying information, and the header information, which corresponds to the metadata, as described above. In this embodiment, the packet register 213 has six register regions to enable the writing of eight pieces of metadata, and 64 bytes are prepared for one register region. In other words, the packet register 213 is used to write the metadata in the case where the size information of the metadata (table data) indicated by the 1st and 0th bits of the LPM Flag is small (S), that is, a maximum of 55 bytes (max 55 byte). The CPU 151 is capable of reading and processing the metadata written in the packet register 213.

In each of the packet registers 211, 212, and 213, a predetermined number of regions, for example, two register regions are set as register regions where the overwriting is not enabled to be prohibited. The user data in the case where the "Instancy" or "Single" flag is set is written in the register region where overwriting is enabled to be prohibited.

In this embodiment, information items as illustrated in FIG. 11(a) are written in one register region in each of the packet registers 211, 212, and 213. In other words, 1-byte status flag (Status Flag, as illustrated) information, 2-byte line number (Line-No.), 1-byte data ID (DID), 1-byte secondary data ID (SDID), 1-byte data count (Data Count), 2-byte number information (LPM Number), 1-byte various types of flag information (LPM Flag), and a predetermined number of bytes of main data (metadata) are written.

FIG. 11(b) illustrates an example of the contents of the status flag (Status Flag) information. The 7th bit is a flag indicating the state of the "history" flag included in the various types of flag information (LPM Flag). In one example, the value "0" indicates "0" indicating that the "history" flag is not the history data, and "1" indicates "1" indicating that the "history" flag is the history data.

The 6th bit is a flag indicating the state of the "Instancy" flag included in the various types of flag information (LPM Flag). In one example, the value "0" indicates "0" indicating that the "Instancy" flag is not the metadata that requires instancy, and "1" indicates "1" indicating the "Instancy" flag is the metadata that requires instancy.

The 5th bit is a flag indicating the state of the "Single" flag included in the various types of flag information (LPM Flag). In one example, the value "0" indicates "0" indicating that the "Single" flag is not the single metadata item, and "1" indicates "1" indicating that the "Single" flag is the single metadata item. The 4th bit is a flag indicating whether the checksum (see FIG. 4) of the N+1th byte of the data packet (ancillary packet) is "OK" or "NG". In one example, the value "0" indicates "OK", and "1" indicates "NG".

The 0th bit indicates whether or not to approve the overwriting. In one example, the value "0" indicates approval, and "1" indicates disapproval. In one example, in the case where metadata with the "Instancy" or "Single" flag set is written, the 0th bit is set to "1", and the overwriting is disapproved. However, when the metadata is then read by the CPU 151, the 0th bit is set to "0", and the overwriting is approved.

Further, referring again to FIG. 9, the controller 203 detects the data packet including the metadata specified to be extracted from the SDI signal in which timing is adjusted (delayed) by the delay unit 202 on the basis of the write control signal sent from the specifying-determination unit 208. The controller 203 extracts the header information (DID, SDID, Data Count, LPM Number, LPM Flag) included in the data packet and the metadata.

The controller 203 then writes the extracted header information and the metadata in any of the packet registers 211 to 213 depending on the size information of the metadata (table data) sent from the specifying-determination unit 208. In this case, if the size information is large (L), they are written in the packet register 211. In the case where the size information is middle (M), they are written in the packet register 212. In the case where the size information is small (S), they are written in the packet register 213.

Further, the controller 203 writes the metadata in which the "Instancy" or "Single" flag is set and the header information associated with the metadata in the register region where the overwriting on the packet registers 211 to 213 is enabled to be prohibited on the basis of the information indicating that the "Instancy" or "Single" flag is set, which is sent from the specifying-determination unit 208.

In this way, the metadata specified to be extracted is selectively extracted from the VANC region of the SDI signal and is written in the packet registers 211 to 213 on the basis of the write control signal that is sent from the specifying-determination unit 208. This configuration makes it possible to reduce the capacity of the entire packet register, also decreasing the processing load on the CPU 151.

Moreover, the metadata-specifying information to be extracted is set in the handling ID register 207 as described above. The same information is typically superimposed across a plurality of frames for metadata other than the metadata for which the "Instancy" or "Single" flag is set. Thus, the repetitive extraction of the metadata while changing the metadata-specifying information set in the handling ID register 207 makes it possible to extract all the metadata in a state where the capacity of the entire packet register is small, that is, with a small number of hardware resources.

Further, as described above, the LPM Flag includes the size information of the metadata (the 1st and 0th bits), and the extracted header information and metadata are written in one of the packet registers 211 to 213 on the basis of this size information. This configuration makes it possible to eliminate the need to set the register region for all the one packet register to 261 bytes, preventing or reducing an increase in the capacity of the entire packet register. In other words, it is possible to increase the number of metadata that can be written and held in the packet register while preventing or reducing an increase in the capacity of the entire packet register.

Further, in the case where the extracted header information or metadata is written in the register region of the packet registers 211 to 213, the controller 203 adds the status flag information or the line number (Line-No.) to the extracted information and writes them (see FIG. 11(a)). Herein, in the case where the "Instancy" or "Single" flag is set, the controller 203 sets the 0th bit of the status flag information (see FIG. 11(b)) to "1" and sets the overwriting on the register region as disapproval. Then, if the metadata is read by the CPU 151, the 0th bit is set to "0", and the overwriting on the register region is approved.

In the case where the "Instancy" or "Single" flag is set in this way, if the extracted header information and metadata are written in the register region of the packet registers 211 to 213, the overwriting on the register region is not approved until it is read by the CPU 151. Thus, the CPU 151 is capable of acquiring the metadata requesting the instancy (urgency) in which the "Instancy" flag is set or acquiring the single metadata item in which the "Single" flag is set without omission.

Herein, in the case where the "Instancy" flag is set, the controller 203 sends the detection signal S3 of the "Instancy" flag to the interrupt circuit 172 (see FIG. 7). This configuration makes it possible to send the interrupt signal S4 and the interrupt channel number S5 from the interrupt circuit 172 to the CPU 151, allowing the CPU 151 to acquire the metadata of the interrupted channel preferentially.

Moreover, in the case of monitoring the metadata with the "Instancy" or "Single" flag set only by software processing, it is necessary to monitor all metadata of all frames in real-time. However, in the case of equipment with many input systems, it is difficult to continuously monitor all inputs in real-time. However, as described above, in the controller 203, the extracted header information and metadata are written in the register regions of the packet registers 211 to 213, and they are readable by the software (CPU 151) at any optional timing (e.g., polling), which make it easier to acquire without omission.

Further, referring again to FIG. 9, the history-subjected determination unit 209 determines whether or not the metadata included in the data packet having the header information is a history-subjected target on the basis of the header information sequentially extracted by the header information extraction unit 205, for example, the number information (LPM Number). Moreover, specifying the LPM Number to be the history-subjected target can be selected, for example, from only the upper 8 bits "Live Meta U", or from the upper 8 bits "Live Meta U" and the lower 8 bits "Live Meta D".

In one example, in the case where the LPM Number indicates that it is live-purpose metadata such as the pick-me signal, it is determined to be the history-subjected target. In addition, for example, in the case where the number information indicates that the video signal is metadata indicating from which source (e.g., camera, server) the video signal is output, it is determined that the metadata is the history-subjected target.

In the case where the history-subjected determination unit 209 determines that the metadata is the history-subjected target, the history-subjected determination unit 209 sends the history-subjected control signal to the controller 203 in such a way as to set the 7th bit of the LPM Flag of the data packet having the metadata as the "history" flag, that is, the value is set to "1".

The controller 203 performs the history-subjected processing of setting the "history" flag of the 7th bit of the LPM Flag of the data packet having the metadata determined to be the history-subjected target for the SDI signal in which timing is adjusted (delayed) by the delay unit 202 on the basis of the history-subjected control signal, which is to indicate that the metadata is the history data. This configuration makes it possible to change the metadata that is the history-subjected target superimposed on the VANC region of the SDI signal being input into the history data without subjecting software processing.

Moreover, if such history-structuring is performed only by software processing, it is necessary to perform the control described below for each frame to be completed within the frame.

1. Observe the metadata superimposed on the SDI signal and check whether the history-subjected metadata is not included.
2. If the history-subjected metadata is included, check the superimposed lines or cycles, and prepare the data packet information with only the "history" flag rewritten.
3. Overwrite the prepared data packet information at the same position of the SDI signal as the data packet including the history-subjected metadata.

In the case of equipment with many input systems, it is difficult to keep monitoring all the SDI signals being input in real-time.

In this embodiment, as described above, the controller 203 is capable of performing history-subjected processing on the SDI signal in which timing is adjusted (delayed) by the delay unit 202, and in addition, the controller 203 is also capable of performing mask processing on the specified line among the lines on which the metadata is superimposed for the SDI signal. In this mask processing, the data of the line is replaced with a fixed value. In addition, in the case of performing the mask processing, the CPU 151 sets the function to ON and specifies the line number.

The cyclic redundancy check (CRC) unit 204 performs the processing of replacing the CRC with the one after recalculation for the SDI signal subjected to the history-subjected processing and mask processing by the controller 203, obtaining an SDI signal to be output.

Configuration Example of Output Unit

Figure 12:
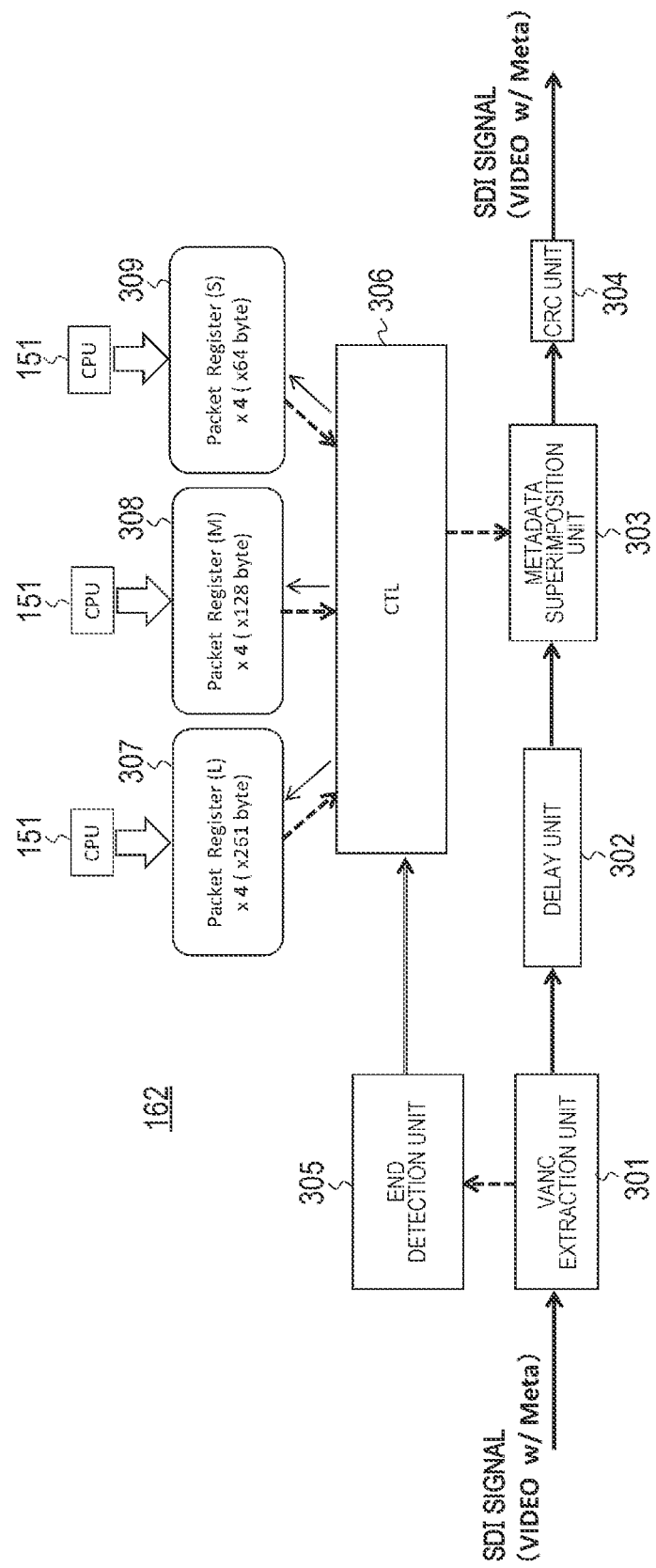
FIG. 12 is a block diagram illustrating a configuration example of an output unit (Output).

FIG. 12 illustrates a configuration example of an output unit (Output) 162 (see FIG. 1). This configuration example is implemented by, for example, a programmable logic device (PLD).

The output unit 162 includes a VANC extraction unit 301, a delay unit 302, a metadata superimposition unit 303, a cyclic redundancy check (CRC) unit 304, an end detection unit 305, a controller 306, and packet registers 307, 308, and 309.

The VANC extraction unit 301 extracts a signal of the VANC region in the SDI signal being input. The delay unit 302 delays the SDI signal (same as the SDI signal being input) output from the VANC extraction unit 301 and inputs the delayed signal to the metadata superimposition unit 303. In this case, the SDI signal is delayed by a predetermined amount of time to match the timing with the data packet sent from the controller 306 to the metadata superimposition unit 303 to be described later.

The end detection unit 305 extracts the superimposed data packet in each line of the VANC region extracted by the VANC extraction unit 301 and detects the end of the last data packet superimposed on the line. In a line where the data packet is not superimposed, the leading position of the line is regarded as the end of the last data packet superimposed on the line.

In this case, it is conceivable that the next data packet is not necessarily continuous at the end of a certain data packet and that the next data packet overlaps. Thus, in the case where the end of a certain data packet is detected and the next data packet is not detected until a predetermined number of cycles, for example, 5 cycles elapse, the end detection unit 302 definitively determines the end of the certain data packet as the end of the data packet. Herein, whether or not the next data packet is detected depends on whether or not the 3-word ancillary data flag (ADF) (see FIG. 4) located at the beginning of the data packet is detected. Herein, one cycle corresponds to a one-word (10 bits) period.

The end detection unit 305 sends a metadata superimposition control signal to the controller 306 at the definitive determination timing of the end detection on each line. In this case, the end detection unit 305 sends the metadata superimposition control signal with the line number (Line-No.) information attached.

The packet register (L) 307 is a register that holds information (including header information and metadata) of a metadata packet to be newly superimposed. In this embodiment, the packet register 307 has four register regions in order to be able to hold information for four metadata packets. In this case, 261 bytes are prepared for one register region.

In the case where the size information of the metadata (table data) indicated by the 1st and 0th bits of the LPM Flag is large (L), that is, a maximum of 252 bytes (max 252 byte), the packet register 307 is used to hold information for data packets with the new metadata. The CPU 151 is capable of accessing the packet register 307 to set the information regarding the metadata packet, which is to be newly superimposed, in the packet register 307.

The packet register (M) 308 is also a register that holds information (including header information and metadata) of a metadata packet to be newly superimposed. In this embodiment, the packet register 308 has four register regions in order to be able to hold information for four metadata packets. In this case, 128 bytes are prepared for one register region.

The packet register 308 is used to hold information for data packets with the new metadata in the case where the size information of the metadata (table data) indicated by the 1st and 0th bits of the LPM Flag is middle (M), that is, a maximum of 119 bytes (max 119 byte).

The CPU 151 is capable of accessing the packet register 308 to set the information regarding the metadata packet, which is to be newly superimposed, in the packet register 308.

The packet register (S) 309 is also a register that holds information (including header information and metadata) of a metadata packet to be newly superimposed. In this embodiment, the packet register 309 has four register regions in order to be able to hold information for four metadata packets. In this case, 64 bytes are prepared for one register region.

The packet register 309 is used to hold information for data packets with the new metadata in the case where the size information of the metadata (table data) indicated by the 1st and 0th bits of the LPM Flag is small (S), that is, a maximum of 55 bytes (max 55 byte).

The CPU 151 is capable of accessing the packet register 309 to set the information regarding the metadata packet, which is to be newly superimposed, in the packet register 309.

Figure 13:
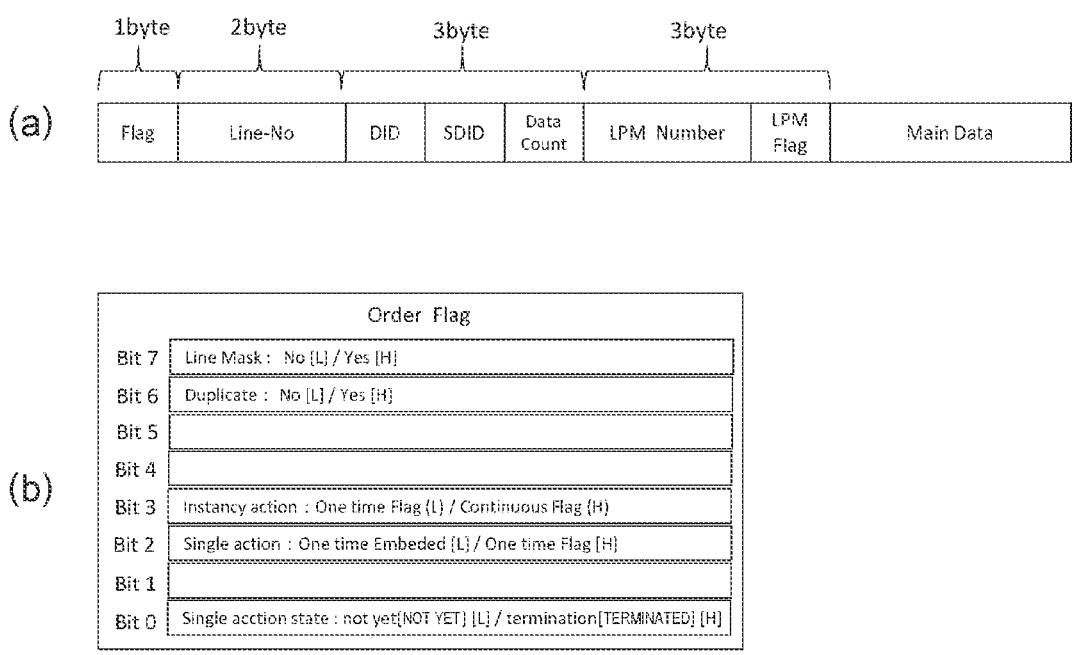
FIG. 13 is a diagram illustrating an example of the contents of information written in one register region of a packet register and order flag information.

In this embodiment, information items as illustrated in FIG. 13(a) are written in one register region in each of the packet registers 307, 308, and 309. In other words, 1-byte order flag (Order Flag, as illustrated) information, 2-byte line number (Line-No.), 1-byte data ID (DID), 1-byte secondary data ID (SDID), 2-byte number information (LPM Number), 1-byte various types of flag information (LPM Flag), and a predetermined number of bytes of main data (metadata) are written. Herein, the line number (Line-No.) has, for example, a 12-bit representation.

FIG. 13(b) illustrates an example of the contents of the order flag information. The 7th bit is a flag indicating whether or not to enable the function of masking the original data of the specified line, that is, the metadata superimposed. In one example, the value "0" indicates that the function is not enabled, and "1" indicates that it is enabled. Although not described above, this masking function is executed in the VANC extraction unit 201.

The 6th bit is a flag indicating whether or not to automatically enable the function of duplicating metadata even in the even-numbered field line of +563 in the case where the SDI signal has the level-B SDI format structure (see FIG.

2(a)). In one example, the value "0" indicates that the function is not enabled, and "1" indicates that it is enabled. In the case where this function is enabled, the flag information of the 7th bit described above is also applied to the even-numbered field line of +563.

The 3rd bit is a flag indicating an operation (Instancy action) in the case where the "Instancy" flag is set, that is, the value is set to "1". In one example, the value "0" indicates the hardware sets the "Instancy" flag to "0" and duplicates from the next time (next frame) after one-time duplicating. The value "1" indicates that the duplicating will continue from the next time (next frame) as it is, that is, the flag of "Instancy" remains "1".

The 2nd bit is a flag indicating an operation (Single action) in the case where the "Single" flag is set, that is, the value is set to "1". In one example, the value "0" indicates the hardware stops the duplicating from the next time (next frame) after one-time duplicating. The value "1" indicates that the hardware sets the flag of "Single" to "0" and duplicates from the next time (next frame).

The 0th bit is a flag indicating whether or not the metadata has been duplicated. In one example, the value "0" indicates that it has not been performed yet, and "1" indicates that it has previously been performed.

Further, referring again to FIG. 12, the controller 306 extracts the information regarding the relevant data packet from the packet registers 307 to 309, adds a 3-word ancillary data flag (ADF) to the extracted information, and sends it to the metadata superimposition unit 303 as a data packet format on the basis of the metadata superimposition control signal and line number (Line-No.) information sent from the end detection unit 305. In this case, in the case where there are multiple pieces of data packet information corresponding to the packet registers 307 to 309, the controller 306 sends the data packets to be superimposed to the metadata superimposition unit 303, for example, in ascending order of the size of the metadata.

Further, in this way, the controller 306 extracts the information regarding the corresponding data packet from the packet registers 307 to 309. When the controller 306 sends the data packet including the extracted information to the metadata superimposition unit 303, if the 0th bit of the order flag information added to the information regarding the data packet in the packet registers 307 to 309 is "0", the controller 306 changes the bit value to "1". This configuration allows for indicating that the metadata has previously been duplicated.

Herein, in the case where the "Instancy" flag is "1" in the information regarding the relevant data packet included in the packet registers 307 to 309, the controller 306 performs an operation depending on the state of the "Instancy action" flag of the 3rd bit of the order flag information. In other words, in the case where the "Instancy action" flag is "0", after duplicating one frame, in the subsequent frames, the "Instancy" flag is changed to "0" to generate a data packet to be superimposed, and it is sent to the metadata superimposition unit 303. In addition, if the "Instancy action" flag is "1", a data packet to be superimposed is generated with the "Instancy" flag set to "1" even in the subsequent frames after duplicating one frame, and the generated data packet is sent to the metadata superimposition unit 303.

In addition, in the case where the "Single" flag is "1" in the information regarding the relevant data packet included in the packet registers 307 to 309, the controller 306 performs an operation depending on the state of the "Single action" flag of the 2nd bit of the order flag information. Furthermore, in the case where the "Single action" flag is "0", after duplicating one frame, in the subsequent frames, generating a data packet to be superimposed to be sent to the metadata superimposition unit 303 is not performed. Furthermore, in the case where the "Single action" flag is "1", after duplicating one frame, in the subsequent frames, the "Single Instancy" flag is changed to "0" to generate a data packet to be superimposed, and it is sent to the metadata superimposition unit 303.

The metadata superimposition unit 303 performs processing of superimposing data packet sent from the controller 306 on lines each corresponding to the VANC region of the SDI signal in which timing is adjusted (delayed) by the delay unit 302. In this case, the metadata superimposition unit 303 superimposes a new data packet, following the end of the last data packet superimposed previously. Here, in a case where a plurality of new data packets is superimposed, the next data packet is superimposed sequentially, following the end of the last data packet.

The cyclic redundancy check (CRC) unit 304 performs the processing of replacing the CRC with the one after recalculation for the SDI signal subjected to the superimposing processing by the metadata superimposition unit 303, obtaining an SDI signal to be output.

In the case where many data packets are previously superimposed on the VANC region of the SDI signal being input, the additional superimposition of the new data packet on a certain line requires control of detecting the end of the data packet previously superimposed on the line and starting the overwriting of the new data packet to be newly superimposed from the detected end.

In the output unit 162 illustrated in FIG. 12, the end detection unit 305 implemented by hardware detects the end of the previously superimposed data packet of the relevant line in the VANC region. The controller 306 sends the new data packet to the metadata superimposition unit 303 implemented by hardware on the basis of the detection timing. The new data packet is superimposed, following from the end of the previously superimposed data packet of the relevant line.

As described above, the output unit 162 illustrated in FIG. 12 is provided with an automatic control function for the superimposition position. Therefore, using software, it is possible to superimpose the new data packet automatically at the correct position of the line to be superimposed by just specifying the information regarding the data packet to be superimposed and the line.

Further, the metadata for which the "Single" flag is set is required to be superimposed only on a single frame, but it is difficult to perform processing in units of one frame by software. In other words, in the case where the metadata for which the "Single" flag is set is superimposed in a certain frame, it is difficult to control stopping the superimposition of the metadata without exception in the next frame by software.

The output unit 162 illustrated in FIG. 12 is provided with a frame-based automatic control function (metadata sendout assist function) for the metadata for output by hardware, and the metadata with the "Single" or "Instancy" flag set is appropriately sent out.

In other words, for a data packet including the metadata for which the "Single" flag is set, the controller 306 implemented by hardware duplicates the packet one time and then stops the duplicating the next time (next frame) or duplicates it by dropping the "Single" flag. In addition, for a data packet including the metadata with the "Instancy" flag set, the controller 306 implemented by hardware duplicates it one time and then drops the "Instancy" flag to duplicate it or duplicates with the "Instancy" flag set.

Another Configuration Example of Input Unit

Figure 14:
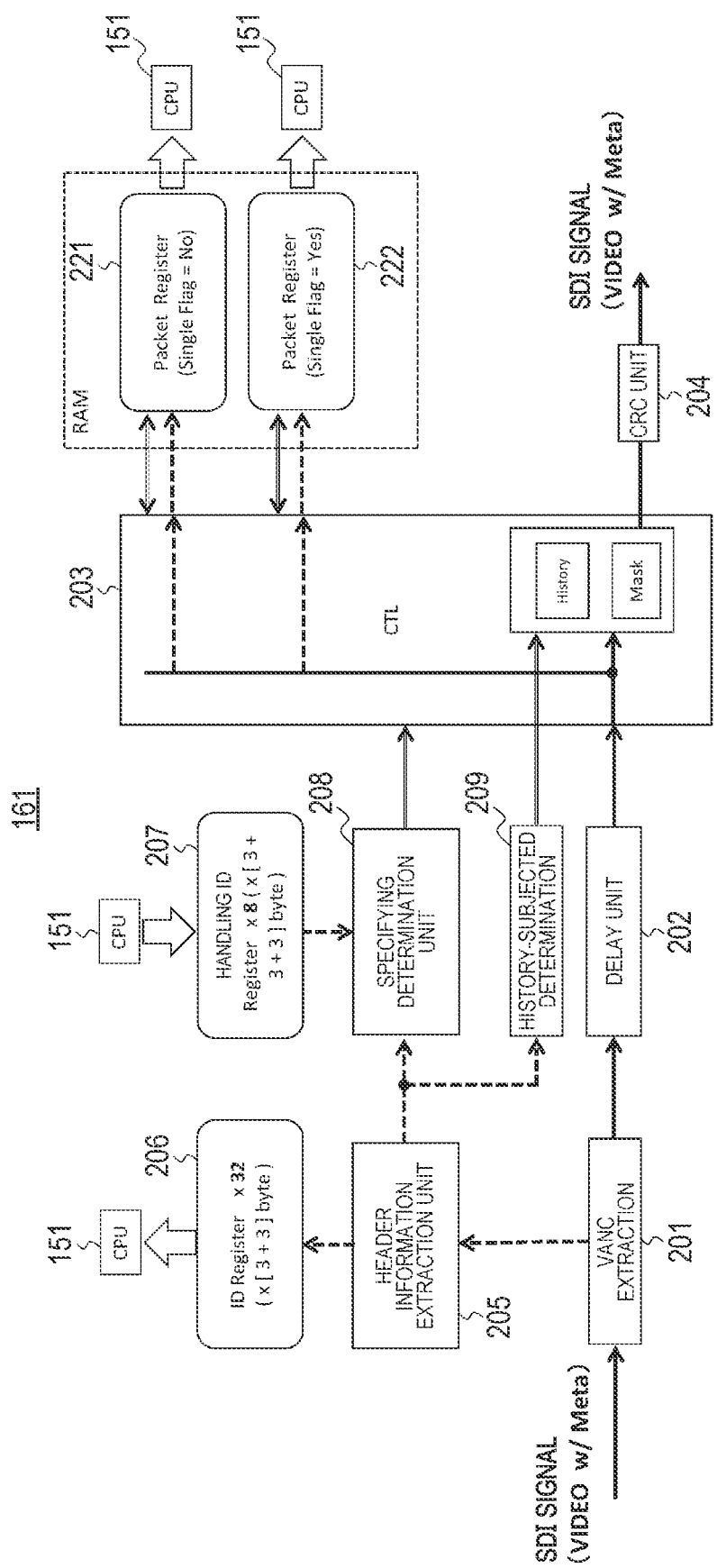
FIG. 14 is a block diagram illustrating another configuration example of the output unit (Output).

FIG. 14 illustrates another configuration example of the input unit (Input) 161. In FIG. 14, the parts corresponding to those in FIG. 9 are assigned by the same reference numerals, and a detailed description thereof will be omitted as appropriate.

The specifying-determination unit 208 determines whether or not the metadata included in the data packet having the header information extracted by the header information extraction unit 205 satisfies the metadata-specifying information set in the handling ID register 207 on the basis of the header information sequentially extracted by the header information extraction unit 205 and the line information in which the data packet having the header information is embedded.

In the case of determining that the metadata satisfies the metadata-specifying information, the specifying-determination unit 208 sends a write control signal to the controller 203 in such a way as to write the header information and the metadata included in the data packet in the register. In addition, if the specifying-determination unit 208 sends a write control signal to the controller 203, in the case where the "Instancy" flag of the 6th bit in the LPM Flag is set or the "Single" flag of the 5th bit is set, the specifying-determination unit 208 also sends information indicating this status to the controller 203.

Packet registers 221 and 222 are registers for writing the metadata, which satisfies the metadata-specifying information, and the header information, which corresponds to the metadata, as described above. The CPU 151 is capable of reading and processing the metadata written in the packet registers 221 and 222.

The packet register 222 is the register for writing the metadata that needs to be held until it is read by the CPU 151, in which the metadata for which the "Single" flag is set. The metadata written in the packet register 222 is kept holding unless the reading and clearing operation is performed.

Herein, the reading and clearing operation is a clear operation with reading and checking.

In checking the reading flag, if the reading flag is "1", the reading is successful and the internal data is cleared. On the other hand, in checking the reading flag, if the reading flag is "0", the reading is regarded as a failure, and the internal data is retained. If the next metadata is input, it is added to the back.

The packet register 221 is herein the register for writing the metadata in which the "Single" flag is not set. The metadata written in the packet register 221 is reset at, for example, the start timing of each frame.

Figure 15:
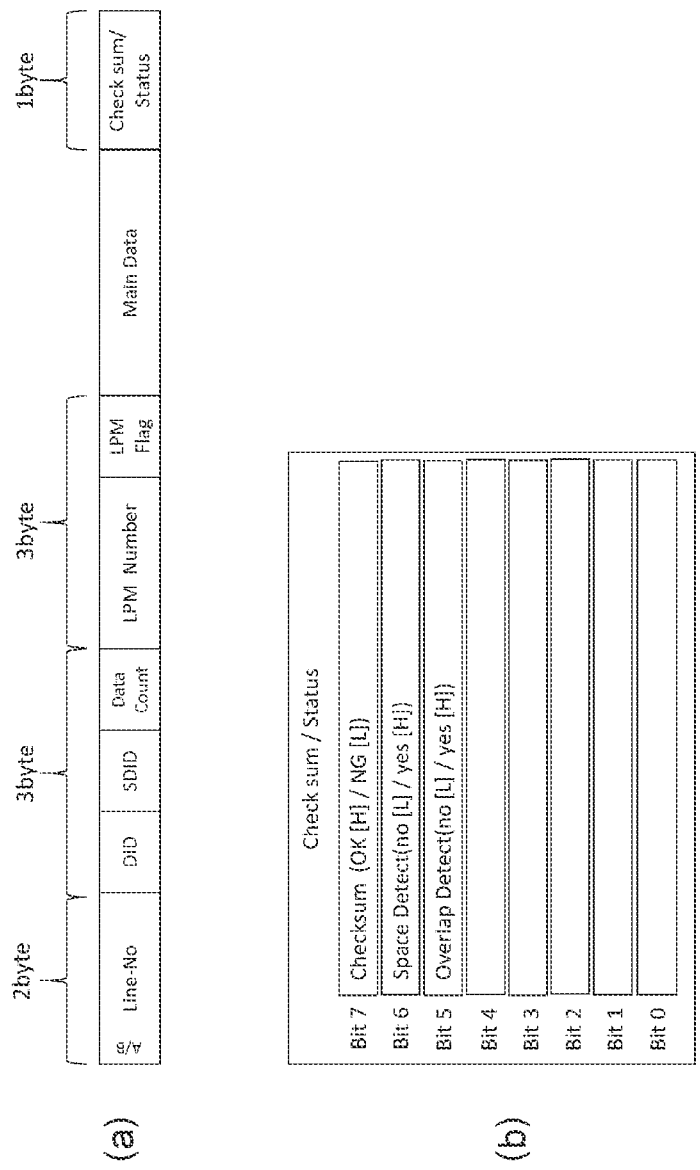
FIG. 15 is a diagram illustrating an example of information corresponding to one piece of metadata written in a packet register and an example of the contents of check sum/status information.

FIG. 15(a) illustrates an example of information corresponding to one piece of metadata written in the packet registers 221 and 222. This information includes, 2-byte line number (Line-No.), 1-byte data ID (DID), 1-byte secondary data ID (SDID), 1-byte data count (Data Count), 2-byte number information (LPM Number), 1-byte various types of flag information (LPM Flag), and a predetermined number of bytes of main data (metadata), and 1 byte check sum/status information.

FIG. 15(b) illustrates an example of the contents of check sum/status information. The 7th bit is a flag indicating whether the checksum (see FIG. 4) of the N+1th byte of the data packet (ancillary packet) is "OK" or "NG". In one example, the value "0" indicates "OK", and "1" indicates "NG".

The 6th bit is a flag that is asserted if an unnecessary blank is detected between the metadata items superimposed on the same line on the premise that the metadata items superimposed on the same line are tightly packed. In one example, the value "0" indicates that an unnecessary blank is not detected, and "1" indicates that an unnecessary blank is detected.

The 5th bit is a flag that is asserted in the case where the next metadata arrives before the required size of data is detected (stored) though the size of the metadata can be known by the data count. In one example, the value "0" indicates that the next metadata has not arrived before the required size of data is detected (stored), and "1" indicates that the next metadata has arrived before the required size of data is detected (stored).

Further, referring again to FIG. 14, the controller 203 detects the data packet including the metadata specified to be extracted from the SDI signal in which timing is adjusted (delayed) by the delay unit 202 on the basis of the write control signal sent from the specifying-determination unit 208. The controller 203 extracts the header information (DID, SDID, Data Count, LPM Number, LPM Flag) included in the data packet and the metadata.

Then, the controller 203 writes the metadata for which the "Single" flag is set or its related header information in the packet register 222 and writes other metadata and its related header information in the packet register 221 on the basis of the information indicating that the "Single" flag is set, which is sent from the specifying-determination unit 208.

The other configuration of the input unit (Input) 161 illustrated in FIG. 14 is similar to that of the input unit (Input) 161 illustrated in FIG. 9, though a detailed description is omitted.

In the case of switching the packet register to be held depending on the size of the metadata as in the configuration of the input unit (Input) 161 illustrated in FIG. 9, If the ratio of the number of the metadata included in the VANC region of the SDI signal being input for each size and the ratio for each size of the packet register being prepared are significantly different, the packet register will be wasted.

In the configuration of the input unit (Input) 161 illustrated in FIG. 14, the controller 203 writes the metadata extracted from the VANC region of the SDI signal in the packet registers 221 and 222 without determining its size, holding them by tying them in a row. Thus, waste such as the configuration of the input unit (Input) 161 illustrated in FIG. 9 is prevented from occurring. Moreover, in the configuration of the input unit (Input) 161 illustrated in FIG. 14, the size of each metadata written in the packet registers 221 and 222 is different, so it is difficult to acquire individual metadata from the CPU 151, and data acquisition is performed by scanning the entire register region.

As described above, in the input unit (Input) 161 in the video system 10 illustrated in FIG. 1, predetermined metadata is extracted from the VANC region of the SDI signal being input on the basis of the metadata-specifying information and is written in the accumulating register (packet register). Thus, even in the case where the metadata included in the VANC region of the SDI signal being input increases, it is possible to prevent or reduce an increase in memory hardware, decreasing the load on the CPU 151 that reads and processes the metadata from the accumulating register.

Further, the output unit 162 in the video system 10 illustrated in FIG. 1 is provided with the automatic control function of the superimposition position, which detects the end of the last data packet previously superimposed on the specified line in the VANC region of the SDI signal being input and superimposes the new data packet, following the end of the data packet. Thus, in CPU (software) 151, it is possible to superimpose the new data packet automatically at the correct position of the line to be superimposed by just specifying the information regarding the data packet to be superimposed and the line.

<2. Modification>

Moreover, although not described above, it is possible to similarly apply the present technology to a video system that transmits a video signal by an IP packet.

In addition, the preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects and are not necessarily limitative. That is, with or in the place of the above effects, the technology according to the present disclosure may achieve other effects that are clear to those skilled in the art on the basis of the description of this specification.

Additionally, the present technology may also be configured as below.

(1) A signal processing apparatus including:
a signal input unit configured to receive as an input a video signal and a digital signal for transmission, the digital signal for transmission including a data packet with metadata associated with the video signal; and
a data writing unit configured to extract predetermined metadata from the digital signal for transmission on the basis of metadata-specifying information and write the extracted metadata in an accumulating register.

(2) The signal processing apparatus according to (1), in which
the metadata-specifying information includes header information of the data packet with the predetermined metadata.

(3) The signal processing apparatus according to (2), in which
the header information includes classification information indicating a classification for the predetermined metadata.

(4) The signal processing apparatus according to (3), in which
the classification information includes first classification information and second classification information, the first classification information indicating a classification for the predetermined metadata, the second classification information indicating a sub-classification under the classification by the first classification information of the predetermined metadata.

(5) The signal processing apparatus according to (3) or (4), in which
the header information further includes auxiliary information of the predetermined metadata.

(6) The signal processing apparatus according to (5), in which
the auxiliary information includes information indicating that the predetermined metadata is history data.

(7) The signal processing apparatus according to (5), in which
the auxiliary information includes information indicating that the predetermined metadata is metadata that requires instancy.

(8) The signal processing apparatus according to (7), in which
the data writing unit writes the predetermined metadata in a register region of the accumulating register and interrupts software, the register region being to keep holding the predetermined metadata until being read by the software.

(9) The signal processing apparatus according to (5), in which
the auxiliary information includes information indicating that the predetermined metadata is a single metadata item.

(10) The signal processing apparatus according to (9), in which
the data writing unit writes the predetermined metadata in a register region of the accumulating register, the register region being to keep holding the predetermined metadata until being read by software.

(11) The signal processing apparatus according to any one of (1) to (10), further including:
an information addition unit configured to add auxiliary information to the data packet upon outputting the digital signal for transmission being input in a case where the metadata included in the data packet included in the digital signal for transmission being input is history-subjected metadata, the auxiliary information indicating that the metadata included in the data packet is history data.

(12) The signal processing apparatus according to any one of (1) to (11), further including:
a header information extraction unit configured to extract header information of the data packet included in the digital signal for transmission being input; and
a register configured to hold the extracted header information.

(13) The signal processing apparatus according to any one of (1) to (12), in which
the digital signal for transmission is a serial digital signal in SDI format, and
the data packet is embedded in an ancillary region of the serial digital signal in the SDI format.

(14) A signal processing method including:
receiving as an input a video signal and a digital signal for transmission, the digital signal for transmission including a data packet with metadata associated with the video signal; and
extracting predetermined metadata from the digital signal for transmission on the basis of metadata-specifying information and writing the extracted metadata in an accumulating register.

(15) A signal processing apparatus including:
a signal input unit configured to receive as an input a digital signal for transmission including a video signal; and
a signal output unit configured to superimpose and output a data packet on a specified line of the digital signal for transmission being input, the data packet being to be newly superimposed and having metadata associated with the video signal,
in which the signal output unit includes
an end detection unit configured to detect an end of a last data packet superimposed previously on the specified line of the digital signal for transmission being input, and
a data superimposition unit configured to superimpose the data packet to be newly superimposed, following the end of the last data packet superimposed previously on the specified line of the digital signal for transmission being input on the basis of the detection of the end.

(16) The signal processing apparatus according to (15), in which the end detection unit definitively determines an end of a particular data packet as the end of the last data packet in a case where the end of the particular data packet is detected, and then a next data packet is not detected by lapse of a predetermined number of cycles.

(17) The signal processing apparatus according to (15) or (16), further including:

a register configured to hold information regarding the data packet to be newly superimposed, in which the signal output unit, in a case where the data packet to be newly superimposed includes information indicating that the metadata included in the data packet requires instancy, in a frame subsequent to superimposing one frame of the data packet to be newly superimposed, continues to superimpose the data packet to be newly superimposed by changing the information indicating that the metadata to be superimposed requires instancy into information indicating that the metadata to be superimposed does not require instancy, or continues to superimpose without the information change.

(18) The signal processing apparatus according to (15) or (16), further including:

a register configured to hold information regarding the data packet to be newly superimposed, in which the signal output unit, in a case where the data packet to be newly superimposed includes information indicating that the metadata included in the data packet is a single metadata item, in a frame subsequent to superimposing one frame of the data packet to be newly superimposed, makes the superimposition be stopped, or continues the superimposition by changing the information indicating that the metadata is the single metadata item into information indicating that the metadata is not the single metadata item.

(19) The signal processing apparatus according to any one of (15) to (18), in which the digital signal for transmission is a serial digital signal in SDI format, and the data packet is embedded in an ancillary region of the serial digital signal in the SDI format.

(20) A signal processing method including:

a signal input step of receiving as an input a digital signal for transmission including a video signal; and a signal output step of superimposing and outputting a data packet on a specified line of the digital signal for transmission being input, the data packet being to be newly superimposed and having metadata associated with the video signal, in which the signal output step includes detecting an end of a last data packet superimposed previously on the specified line of the digital signal for transmission being input, and superimposing the data packet to be newly superimposed, following the end of the last data packet superimposed previously on the specified line of the digital signal for transmission being input on the basis of the detection of the end.

REFERENCE SIGNS LIST

10 Video system
101, 101-1 to 101-3 Camera device
102, 102-1 to 102-3 Cable
103, 103-1 to 103-3 CCU
104 Video tape recorder
105 Switcher
106 Server
107, 108 Monitor
109 Converter
110-1 to 110-3 Waveform monitor
111 Lens device
112 Camera CPU
113 Sensor unit
114 Camera signal processing unit
115 Pick-me switch
116 USB terminal
131 CPU
132 Video processing unit
133 Video formatter
134 USB terminal
151 CPU
152 Router
153 Video processor
161 Input unit
162 Output unit
171 Selector
172 Interrupt circuit
201 VANC extraction unit
202 Delay unit
203 Controller
204 CRC unit
205 Header information extraction unit
206 ID register
207 Handling ID register
208 Specifying-determination unit
209 History-subjected determination unit
211, 212, 213, 221, 222 Packet register
301 VANC extraction unit
302 Delay unit
303 Metadata superimposition unit
305 End detection unit
306 Controller
307, 308, 309 Packet register

The invention claimed is:

1. A signal processing apparatus comprising:
   a signal input unit configured to receive as an input a video signal and a digital signal for transmission, the digital signal for transmission including a data packet with metadata associated with the video signal; and
   a data writing unit configured to extract predetermined metadata from the digital signal for transmission on a basis of metadata-specifying information and write the extracted metadata in an accumulating register,
   wherein the metadata-specifying information includes header information of the data packet with the predetermined metadata,
   wherein the header information includes classification information indicating a classification for the predetermined metadata,
   wherein the header information further includes auxiliary information of the predetermined metadata,
   wherein the auxiliary information includes information indicating that the predetermined metadata is history data, and
   wherein the signal input unit and the data writing unit are each implemented via at least one processor.

2. The signal processing apparatus according to claim 1, wherein the classification information includes first classification information and second classification information, the first classification information indicating a classification for the predetermined metadata, the second classification information indicating a sub-classification under the classification by the first classification information of the predetermined metadata.

3. A signal processing apparatus comprising:
a signal input unit configured to receive as an input a video signal and a digital signal for transmission, the digital signal for transmission including a data packet with metadata associated with the video signal; and
a data writing unit configured to extract predetermined metadata from the digital signal for transmission on a basis of metadata-specifying information and write the extracted metadata in an accumulating register,
wherein the metadata-specifying information includes header information of the data packet with the predetermined metadata,
wherein the header information includes classification information indicating a classification for the predetermined metadata,
wherein the header information further includes auxiliary information of the predetermined metadata,
wherein the auxiliary information includes information indicating that the predetermined metadata is metadata that requires instancy, and
wherein the signal input unit and the data writing unit are each implemented via at least one processor.

4. The signal processing apparatus according to claim 3, wherein
the data writing unit writes the predetermined metadata in a register region of the accumulating register and interrupts software, the register region being to keep holding the predetermined metadata until being read by the software.

5. A signal processing apparatus comprising:
a signal input unit configured to receive as an input a video signal and a digital signal for transmission, the digital signal for transmission including a data packet with metadata associated with the video signal; and
a data writing unit configured to extract predetermined metadata from the digital signal for transmission on a basis of metadata-specifying information and write the extracted metadata in an accumulating register,
wherein the metadata-specifying information includes header information of the data packet with the predetermined metadata,
wherein the header information includes classification information indicating a classification for the predetermined metadata,
wherein the header information further includes auxiliary information of the predetermined metadata,
wherein the auxiliary information includes information indicating that the predetermined metadata is a single metadata item, and
wherein the signal input unit and the data writing unit are each implemented via at least one processor.

6. The signal processing apparatus according to claim 5, wherein
the data writing unit writes the predetermined metadata in a register region of the accumulating register, the register region being to keep holding the predetermined metadata until being read by software.

7. A signal processing apparatus comprising:
a signal input unit configured to receive as an input a video signal and a digital signal for transmission, the digital signal for transmission including a data packet with metadata associated with the video signal;
a data writing unit configured to extract predetermined metadata from the digital signal for transmission on a basis of metadata-specifying information and write the extracted metadata in an accumulating register; and
an information addition unit configured to add auxiliary information to the data packet upon outputting the digital signal for transmission being input in a case where the metadata included in the data packet included in the digital signal for transmission being input is history-subjected metadata, the auxiliary information indicating that the metadata included in the data packet is history data,
wherein the signal input unit, the data writing unit, and the information addition unit are each implemented via at least one processor.

8. The signal processing apparatus according to claim 1, further comprising:
a header information extraction unit configured to extract the header information of the data packet included in the digital signal for transmission being input; and
a register configured to hold the extracted header information,
wherein the header information extraction unit is implemented via at least one processor.

9. The signal processing apparatus according to claim 1, wherein
the digital signal for transmission is a serial digital signal in SDI format, and
the data packet is embedded in an ancillary region of the serial digital signal in the SDI format.

10. A signal processing method comprising:
receiving as an input a video signal and a digital signal for transmission, the digital signal for transmission including a data packet with metadata associated with the video signal; and
extracting predetermined metadata from the digital signal for transmission on a basis of metadata-specifying information and writing the extracted metadata in an accumulating register,
wherein the metadata-specifying information includes header information of the data packet with the predetermined metadata,
wherein the header information includes classification information indicating a classification for the predetermined metadata,
wherein the header information further includes auxiliary information of the predetermined metadata, and
wherein the auxiliary information includes information indicating that the predetermined metadata is history data.

11. A signal processing apparatus comprising:
a signal input unit configured to receive as an input a digital signal for transmission including a video signal;
a signal output unit configured to superimpose and output a data packet on a specified line of the digital signal for transmission being input, the data packet being to be newly superimposed and having metadata associated with the video signal;
wherein the signal output unit includes
an end detection unit configured to detect an end of a last data packet superimposed previously on the specified line of the digital signal for transmission being input, and
a data superimposition unit configured to superimpose the data packet to be newly superimposed, following the end of the last data packet superimposed previously on the specified line of the digital signal for transmission being input on a basis of the detection of the end; and a register configured to hold information regarding the data packet to be newly superimposed, wherein the signal output unit, in a case where the data packet to be newly superimposed includes information indicating that the metadata included in the data packet requires instancy, in a frame subsequent to superimposing one frame of the data packet to be newly superimposed, continues to superimpose the data packet to be newly superimposed by changing the information indicating that the metadata to be superimposed requires instancy into information indicating that the metadata to be superimposed does not require instancy, or continues to superimpose without the information change, and wherein the signal input unit, the signal output unit, the end detection unit, and the data superimposition unit are each implemented via at least one processor.

12. The signal processing apparatus according to claim 11, wherein the end detection unit definitively determines an end of a particular data packet as the end of the last data packet in a case where the end of the particular data packet is detected, and then a next data packet is not detected by lapse of a predetermined number of cycles.

13. A signal processing apparatus comprising:

a signal input unit configured to receive as an input a digital signal for transmission including a video signal;

a signal output unit configured to superimpose and output a data packet on a specified line of the digital signal for transmission being input, the data packet being to be newly superimposed and having metadata associated with the video signal;

wherein the signal output unit includes an end detection unit configured to detect an end of a last data packet superimposed previously on the specified line of the digital signal for transmission being input, and a data superimposition unit configured to superimpose the data packet to be newly superimposed, following the end of the last data packet superimposed previously on the specified line of the digital signal for transmission being input on a basis of the detection of the end; and a register configured to hold information regarding the data packet to be newly superimposed, wherein the signal output unit, in a case where the data packet to be newly superimposed includes information indicating that the metadata included in the data packet is a single metadata item, in a frame subsequent to superimposing one frame of the data packet to be newly superimposed, makes the superimposition be stopped, or continues the superimposition by changing the information indicating that the metadata is the single metadata item into information indicating that the metadata is not the single metadata item, and wherein the signal input unit, the signal output unit, the end detection unit, and the data superimposition unit are each implemented via at least one processor.

14. The signal processing apparatus according to claim 11, wherein the digital signal for transmission is a serial digital signal in SDI format, and the data packet is embedded in an ancillary region of the serial digital signal in the SDI format.

15. A signal processing method comprising:

a signal input step of receiving as an input a digital signal for transmission including a video signal;

a signal output step of superimposing and outputting a data packet on a specified line of the digital signal for transmission being input, the data packet being to be newly superimposed and having metadata associated with the video signal, wherein the signal output step includes detecting an end of a last data packet superimposed previously on the specified line of the digital signal for transmission being input, and superimposing the data packet to be newly superimposed, following the end of the last data packet superimposed previously on the specified line of the digital signal for transmission being input on a basis of the detection of the end; and holding, in a register, information regarding the data packet to be newly superimposed, wherein, in the signal output step, in a case where the data packet to be newly superimposed includes information indicating that the metadata included in the data packet requires instancy, in a frame subsequent to superimposing one frame of the data packet to be newly superimposed, continuing to superimpose the data packet to be newly superimposed by changing the information indicating that the metadata to be superimposed requires instancy into information indicating that the metadata to be superimposed does not require instancy, or continuing to superimpose without the information change.

* * * * *